US011754998B2

(12) United States Patent
Zhao et al.

(10) Patent No.: US 11,754,998 B2
(45) Date of Patent: Sep. 12, 2023

(54) SYSTEM AND METHODS FOR AUTOMATED MODEL DEVELOPMENT FROM PLANT HISTORICAL DATA FOR ADVANCED PROCESS CONTROL

(71) Applicant: AspenTech Corporation, Bedford, MA (US)

(72) Inventors: Hong Zhao, Sugar Land, TX (US); Qingsheng Quinn Zheng, Sugar Land, TX (US); Kerry Clayton Ridley, Houston, TX (US); Liangfeng Lao, Houston, TX (US); Yizhou Fang, Katy, TX (US)

(73) Assignee: AspenTech Corporation, Bedford, MA (US)

( * ) Notice: Subject to any disclaimer, the term of this patent is extended or adjusted under 35 U.S.C. 154(b) by 303 days.

(21) Appl. No.: 17/074,140

(22) Filed: Oct. 19, 2020

(65) Prior Publication Data

US 2021/0116891 A1    Apr. 22, 2021

Related U.S. Application Data

(60) Provisional application No. 62/923,046, filed on Oct. 18, 2019.

(51) Int. Cl.
*G05B 19/4155* (2006.01)
*G06N 3/08* (2023.01)
*G06N 5/02* (2023.01)

(52) U.S. Cl.
CPC ........... *G05B 19/4155* (2013.01); *G06N 3/08* (2013.01); *G06N 5/02* (2013.01); *G05B 2219/42033* (2013.01)

(58) Field of Classification Search
USPC ........................................................ 700/29
See application file for complete search history.

(56) References Cited

U.S. PATENT DOCUMENTS 5,301,101 A    4/1994  MacArthur et al.
5,410,634 A    4/1995  Li
(Continued)

FOREIGN PATENT DOCUMENTS

CN    106600000 A    4/2017
CN    107430398 A    12/2017
(Continued)

OTHER PUBLICATIONS

International Preliminary Report on Patentability received for PCT Patent Application No. PCT/US2020/042239, dated Feb. 17, 2022, 8 pages.
(Continued)

*Primary Examiner* — Jason D Mitchell
(74) *Attorney, Agent, or Firm* — Hamilton, Brook, Smith & Reynolds, P.C.

(57) ABSTRACT

Systems and methods provide a new paradigm of Advanced Process Control that includes building and deploying APC seed models. Embodiments provide automated data cleansing and selection in model identification and adaption in multivariable process control (MPC) techniques. Rather than plant pre-testing onsite for building APC seed models, the embodiments help APC engineers to build APC seed models from existing plant historical data with self-learning automation and pattern recognition, AI techniques. Embodiments further provide "growing" and "calibrating" the APC seed models online with non-invasive closed loop step testing techniques. PID loops and associated SP, PV, and OPs are searched and identified. Only "informative moves" data is screened, identified, and selected among a long history of process variables for seed model development and MPC application. The seed models are efficiently developed while skipping the costly traditional pre-testing steps and (Continued)

SEED-MODEL DEVELOPMENT WORK FLOW minimizing the interferences to the subject production process.

26 Claims, 22 Drawing Sheets

(56) References Cited

U.S. PATENT DOCUMENTS

| | | | |
|---|---|---|---|
| 5,640,491 A | 6/1997 | Bhat et al. | |
| 5,682,309 A | 10/1997 | Bartusiak et al. | |
| 6,056,781 A | 5/2000 | Wassick et al. | |
| 6,088,630 A | 7/2000 | Cawlfield | |
| 6,819,964 B2 | 11/2004 | Harmse | |
| 6,937,966 B1 | 8/2005 | Hellerstein et al. | |
| 7,050,863 B2* | 5/2006 | Mehta | G05B 11/32 700/19 |
| 7,085,615 B2 | 8/2006 | Persson et al. | |
| 7,194,317 B2* | 3/2007 | Kothare | G05B 17/02 702/108 |
| 7,209,793 B2 | 4/2007 | Harmse et al. | |
| 7,213,007 B2 | 5/2007 | Grichnik | |
| 7,257,501 B2* | 8/2007 | Zhan | G05B 13/042 702/182 |
| 7,330,804 B2 | 2/2008 | Turner et al. | |
| 7,421,374 B2* | 9/2008 | Zhan | G05B 17/02 702/189 |
| 8,295,952 B2* | 10/2012 | MacArthur | G05B 17/02 700/32 |
| 8,296,070 B2 | 10/2012 | Paxson et al. | |
| 8,560,092 B2* | 10/2013 | Zheng | G05B 13/048 700/28 |
| 8,755,940 B2 | 6/2014 | Lou et al. | |
| 8,762,301 B1* | 6/2014 | Buckbee, Jr. | G06N 20/00 702/85 |
| 9,046,881 B2 | 6/2015 | Blevins et al. | |
| 9,046,882 B2 | 6/2015 | Bartee et al. | |
| 9,141,911 B2* | 9/2015 | Zhao | G06N 5/02 |
| 9,367,804 B1* | 6/2016 | Moon | G06N 7/01 |
| 9,513,610 B2* | 12/2016 | Zheng | G05B 13/022 |
| 9,535,808 B2 | 1/2017 | Bates | |
| 9,727,035 B2* | 8/2017 | Keenan | G05B 13/04 |
| 10,031,510 B2 | 7/2018 | Zhao et al. | |
| 10,114,367 B2 | 10/2018 | Bates | |
| 10,739,752 B2 | 8/2020 | Zhao et al. | |
| 10,990,067 B2 | 4/2021 | Modi et al. | |
| 2001/0051862 A1 | 12/2001 | Ishibashi et al. | |
| 2003/0220828 A1* | 11/2003 | Hwang | C08F 2/00 700/197 |
| 2004/0153804 A1 | 8/2004 | Blevins et al. | |
| 2004/0249481 A1 | 12/2004 | Zheng et al. | |
| 2005/0010369 A1 | 1/2005 | Varpela et al. | |
| 2005/0096872 A1 | 5/2005 | Blevins et al. | |
| 2005/0240382 A1 | 10/2005 | Nakaya et al. | |
| 2006/0079983 A1* | 4/2006 | Willis | G05B 23/0259 703/2 |
| 2006/0136138 A1 | 6/2006 | Hicklin et al. | |
| 2007/0225835 A1 | 9/2007 | Zhu | |
| 2008/0183311 A1 | 7/2008 | MacArthur et al. | |
| 2009/0222108 A1 | 9/2009 | Lou et al. | |
| 2010/0049369 A1 | 2/2010 | Lou et al. | |
| 2011/0066299 A1* | 3/2011 | Gray | G06Q 10/04 700/291 |
| 2011/0130850 A1 | 6/2011 | Zheng et al. | |
| 2011/0320386 A1 | 12/2011 | Liano et al. | |
| 2012/0003623 A1 | 1/2012 | Bartee et al. | |
| 2012/0004893 A1 | 1/2012 | Vaidyanathan et al. | |
| 2012/0084400 A1 | 4/2012 | Almadi et al. | |
| 2012/0173004 A1 | 7/2012 | Radl | |
| 2012/0221124 A1 | 8/2012 | Thiele et al. | |
| 2013/0151179 A1* | 6/2013 | Gray | H02J 4/00 702/62 |
| 2013/0151212 A1* | 6/2013 | Gray | G06Q 50/06 703/2 |
| 2013/0191106 A1 | 7/2013 | Kephart et al. | |
| 2013/0204403 A1 | 8/2013 | Zheng et al. | |
| 2013/0246316 A1 | 9/2013 | Zhao et al. | |
| 2013/0338842 A1 | 12/2013 | Inoue et al. | |
| 2014/0114598 A1 | 4/2014 | Almadi et al. | |
| 2014/0115121 A1 | 4/2014 | Almadi et al. | |
| 2015/0261200 A1 | 9/2015 | Blevins et al. | |
| 2016/0018796 A1* | 1/2016 | Lu | G05B 13/048 700/29 |
| 2016/0018797 A1* | 1/2016 | Lu | H04L 41/042 700/3 |
| 2016/0171414 A1 | 6/2016 | Lee | |
| 2016/0260041 A1 | 9/2016 | Horn et al. | |
| 2016/0320768 A1 | 11/2016 | Zhao | |
| 2017/0308802 A1 | 10/2017 | Ramsøy et al. | |
| 2018/0019910 A1 | 1/2018 | Tsagkaris et al. | |
| 2018/0060738 A1 | 3/2018 | Achin et al. | |
| 2018/0157225 A1 | 6/2018 | Dave et al. | |
| 2018/0299862 A1 | 10/2018 | Zhao et al. | |
| 2018/0299875 A1 | 10/2018 | Mariswamy et al. | |
| 2018/0341252 A1* | 11/2018 | Lu | G05B 13/048 |
| 2018/0348717 A1* | 12/2018 | Zhao | G05B 13/048 |
| 2019/0095816 A1 | 3/2019 | Lee et al. | |
| 2019/0101902 A1* | 4/2019 | SayyarRodsari | G05B 19/4187 |
| 2019/0102352 A1* | 4/2019 | SayyarRodsari | G06F 17/11 |
| 2019/0102360 A1* | 4/2019 | SayyarRodsari | H04L 43/045 |
| 2019/0102657 A1* | 4/2019 | SayyarRodsari | G05B 23/0281 |
| 2019/0179271 A1 | 6/2019 | Modi et al. | |
| 2019/0188584 A1 | 6/2019 | Rao et al. | |
| 2019/0197403 A1 | 6/2019 | Schmidhuber | |
| 2019/0236447 A1 | 8/2019 | Cohen et al. | |
| 2020/0103838 A1 | 4/2020 | Bertinetti et al. | |
| 2020/0175374 A1 | 6/2020 | Hestness et al. | |
| 2020/0242483 A1 | 7/2020 | Shashikant Rao et al. | |
| 2020/0257969 A1 | 8/2020 | Goloubew et al. | |
| 2020/0258157 A1* | 8/2020 | Law | G06Q 40/04 |
| 2020/0379442 A1 | 12/2020 | Chan | |
| 2020/0387818 A1 | 12/2020 | Chan | |
| 2021/0034023 A1 | 2/2021 | Keenan et al. | |
| 2021/0116891 A1 | 4/2021 | Zhao et al. | |
| 2022/0260980 A1 | 8/2022 | Andreu et al. | |

FOREIGN PATENT DOCUMENTS

| | | |
|---|---|---|
| EP | 2596613 A2 | 5/2013 |
| EP | 2682914 A1 | 1/2014 |
| EP | 2933976 A1 | 10/2015 |
| EP | 2825920 B1 | 1/2021 |
| GB | 2394564 A | 4/2004 |
| GB | 2409293 A | 6/2005 |
| JP | 06-028009 A | 2/1994 |
| JP | 06-083427 A | 3/1994 |
| JP | 06-187004 A | 7/1994 |
| JP | 09-212207 A | 8/1997 |
| JP | 2002-329187 A | 11/2002 |
| JP | 2004-199655 A | 7/2004 |
| JP | 2004-199656 A | 7/2004 |
| JP | 2005-202934 A | 7/2005 |
| JP | 2008-135010 A | 6/2008 |
| JP | 2009-509217 A | 3/2009 |
| JP | 2009-516301 A | 4/2009 |
| JP | 2010-170586 A | 8/2010 |
| JP | 2011-054163 A | 3/2011 |
| JP | 2013535730 A | 7/2011 |
| JP | 2012-089155 A | 5/2012 |
| JP | 2012-256366 A | 12/2012 |
| JP | 2013-012218 A | 1/2013 |
| JP | 2019-021186 A | 2/2019 |
| JP | 2019521444 A | 7/2019 |
| JP | 2021101388 A | 7/2021 |
| WO | 99/26118 A1 | 5/1999 |
| WO | 00/20939 A1 | 4/2000 |
| WO | 2008/119008 A1 | 10/2008 |
| WO | 2012012723 A2 | 7/2011 |
| WO | 2012118067 A1 | 2/2012 |
| WO | 2013170041 A2 | 11/2013 |
| WO | 2015149928 A2 | 10/2015 |
| WO | 2016093960 A1 | 6/2016 |
| WO | 2018009546 A1 | 1/2018 |
| WO | 2018075995 A1 | 4/2018 |

(56) References Cited

FOREIGN PATENT DOCUMENTS

| WO | 2018223000 A1 | 12/2018 |
| WO | 2019/086760 A1 | 5/2019 |
| WO | 2020227383 A1 | 11/2020 |
| WO | 2020247204 A1 | 12/2020 |
| WO | 2021/025841 A1 | 2/2021 |
| WO | 2021076760 A1 | 4/2021 |

OTHER PUBLICATIONS

International Preliminary Report on Patentability received for PCT Patent Application No. PCT/US2020/055787, dated Apr. 28, 2022, 7 pages.
https://www.google.com/search?q=deep+learning&rlz=1C1GCEA_enUS1008&oq=deep+learinig&aqs=chrome.1.69i57j0i10i433j0i10j0i10i131i433j46i10j0i10l3j0i10i433j0i10.5742j0j1&sourceid=chrome&ie=UTF-8. Downloaded from Internet Jun. 16, 2022.
Bhutani, N., et al, "First-Principles, Data-Based, and Hybrid Modeling and Optimization of an Industrial Hydrocracking Unit," Ind. Eng. Chem. Res., 45 (23), pp. 7807-7816 (2006).
Brill, et al., "Transportation of liquids in multiphase pipelines under low liquid loading conditions," Ph.D. Dissertation, The University of Tulsa (1995).
Caetano, E.F., "Upward Vertical Two-Phase Flow Through an Annulus," Ph.D. Dissertation, The University of Tulsa (1985).
Fair, J.R. and Mathews, R.L., "How to predict sieve tray entrainment and flooding," Petro/Chem Engineer 33(10), p. 45, 1961.
Hebert, D., "First-Principle Verus Data-Driven Models—Cost and Time and Skill Required to Develop an Application—Specific Model have Been Barriers to Using First-Principle Modeling Tools" http://www.controlglobal.com/articles/2008/200/ (2008).
http://web.maths.unsw.edu.au/~fkuo/sobol/ (2010).
Hussein, A., "Adaptive Artificial Neural Network-Based Models for Instantaneous Power Estimation Enhancement in Electric Vehicles' Li-Ion Batteries", IEEE Transactions on Industry Applications, vol. 55, No. 1, Jan. 1, 2019, 840-849, XP011700440.
Kister, H.Z., Distillation Operation (Mechanical-Engineering), Bookmart Press, Inc., p. 376, 1990.
Kister, H.Z. and Haas, J.R., "Predict entrainment flooding on sieve and valve trays," Chemical Engineering Progress, 86(9), p. 63, 1990.
Machine Learning in Python, http://dl.acm.org/citation.cfm?id=2078195 (2011).
Pantelides C. C, et al., "The online use of first-principles models in process operations: Review, current status and future needs", Computers & Chemical Engineering, vol. 51, ISSN: 0098-1354, pp. 136-148 (2013).
Potocnik P, et al., "Neural Net Based Hybrid Modeling of the Methanol Synthesis Process", Neural Processing Letters, Kluwer Academic Publishers, No. 3, Jan. 1, 2000, 219-228. XP000949966.
Psichogios, D.C. and Ungar, L. H., "A Hybrid Neural Network-First Principles Approach to Process Modeling," AIChE Journal, 38: 1499-1511 (1992).
Rakthanmanon, et al., "Searching and Mining Trillions of Time Series Subsequences under Dynamic Time Warping," the 18th ACM SIGKDD Conference on Knowledge discovery and Data Mining, Aug. 12-16, 2012.
Random Forest Regressor, http://scikit-learn.org/stable/modules/generated/sklearn.ensemble.RandomForestRegressor.html (2010).
S. Joe and F. Y. Kuo, Remark on Algorithm 659: Implementing Sobol's quasirandom sequence generator, ACM Trans. Math. Softw. 29, 49-57 (2003).
Silver D, et. al. "Mastering the game of Go with deep neural networks and tree search," Nature. 2016; 529:484-489.
Silver, D., et al. "Mastering chess and shogi by self-play with a general reinforcement learning algorithm", arXiv:1712.01815v1 [cs.AI] Dec. 5, 2017.
Venkatasubramanian, V., "The Promise of Artificial Intelligence in Chemical Engineering: Is It Here, Finally?" AIChE Journal, vol. 65-2, pp. 467-479 (Dec. 19, 2018).

Yang, J., "A study of intermittent flow in downward inclined pipes," Ph.D. Dissertation, The University of Tulsa (1996).
Yang, et al., "An integrated multi-task control system for fuel-cell power plants", Decision and Control and European Control Conference (CDC-ECC), 2011 50th IEEE Conference, Dec. 12, 2011, 2988-2993.
Zendehboudi, et al., "Applications of hybrid models in chemical, petroleum, and energy systems: A systematic review," Applied Energy, 228: 2539-2566 (2018).
Zhang et al., "Unified model for gas-liquid pipe flow via slug dynamics—Part 1: Model development," Trans. Of the ASME, 25: 266-273 (2003).
Zhang et al., "Unified model for gas-liquid pipe flow via slug dynamics—Part 2: Model validation," Trans. Of the ASME, 25: 274-283 (2003).
U.S. Appl. No. 16/434,793, filed Jun. 7, 2019, titled: "Asset Optimization Using Integrated Modeling, Optimization, and Artificial Intelligence" to Willie K. C. Chan et al.
International Search Report and Written Opinion for PCT/US2017/040725 dated Oct. 16, 2017., entitled "Computer System And Method For The Dynamic Construction And Online Deployment Of An Operation-Centric First-Principles Process Model For Predictive Analytics."
International Search Report and Written Opinion for PCT/US2020/031636 dated Jul. 15, 2020, entitled "Combining Machine Learning With Domain Knowledge And First Principles For Modeling In The Process Industries."
International Search Report and Written Opinion for PCT/US2020/034530 dated Jul. 24, 2020, entitled "Asset Optimization Using Integrated Modeling, Optimization, and Artificial Intelligence."
U.S. Appl. No. 16/868,183, filed May 6, 2020, titled: "Combining Machine Learning With Domain Knowledge And First Principles For Modeling In The Process Industries", Willie K. C. Chan et al.
International Search Report and Written Opinion for PCT/US2020/055787 dated Jan. 29, 2021 , entitled "System And Methods For Automated Model Development From Plant Historical Data For Advanced Process Control."
Tay et al., "Reluctant generalized additive modeling," Department of Statistics, and Department of Biomedical Data Science, Stanford University, Jan. 15, 2020, 20 pages.
Yu et al., "Reluctant Interaction Modeling," Department of Statistics, University of Washington, Seattle, Washington, 98105, Jul. 22, 2019, 32 pages.
European Search Report Application No. 17 751 159.9, entitled Computer System And Method For The Dynamic Construction And Online Deployment Of An Operation-Centric First-Principles Process Model For Predictive Analytics, dated Jan. 21, 2020.
International Search Report and Written Opinion received for PCT Patent Application No. PCT/US2013/040363, dated Dec. 5, 2013, 9 pages.
Qin, et al., "A Survey of Industrial Model Predictive Control Technology", Control Engineering Practice 11 (2003).
Zhao, et al., "An Identification Approach to Nonlinear State Space Model for Industrial Multivariable Model Predictive Control," Proceedings of the American Control Conference, Philadelphia, PA, Jun. 1998.
International Preliminary Report on Patentability for PCT/US2020/031636 dated Nov. 18, 2021, 11 pages.
International Preliminary Report on Patentability for PCT/US2020/034530 dated Dec. 16, 2021, 8-pages.
International Search Report and Written Opinion received for PCT Patent Application No. PCT/US2020/042239, dated Oct. 14, 2020, 10 pages.
Mohamed, et al., "A Neural-Network-Based Model Predictive Control of Three-Phase Inverter with an Output LC Filter," Cornell University Library, ArXiv:1902.099643v3, XP081457097, whole document, Feb. 22, 2019.
Soliman, M., "Multiple Model Predictive Control for Wind Turbines with Doubly Fed Induction Generators," IEEE Transactions on Sustainable Energy, vol. 2, No. 3, pp. 215-225 (2011).

(56) References Cited

OTHER PUBLICATIONS

Fellini, R., et al., "Optimal design of automotive hybrid powertrain systems," Proceedings First International Symposium on Environmentally Conscious Design and Inverse Manufacturing, IEEE, pp. 400-405 (1999).

Moraru, I.I., et al., "Virtual Cell modelling and simulation software environment," IET System Biology, vol. 2, No. 5, pp. 352-362 (Sep. 2008).

Wetter, M., "A view on future building system modeling and simulation." Building performance simulation for design and operation. Routledge, pp. 631-656. (Year: 2019).

* cited by examiner

CONVENTIONAL APC APPLICATION WORKFLOW

SEED-MODEL DEVELOPMENT WORK FLOW

DATA CLEANSING & PRE-PROCESSING

PID CONTROL LOOP SEARCH

CASCADE CONTRL LOOP SEARCH

DATA SELECTION WITH AI PATTERN SEARCH

ONLINE ADAPTATION OF SEED-MODEL

The following 20 PID Loops were detected:

| PID Loop | Description | Loop Service Factor (%) | Saturation (%) | Normal Mode | Cascade (%) | Auto (%) | Manual (%) | Other (%) |
|---|---|---|---|---|---|---|---|---|
| LC 123 ⓘ | DC2 Level | 98 | 0 | Auto | 0 | 79 | 2 | 19 |
| FC 124 | DC2 Bottoms | 96 | 0 | Cascade LC123 | 80 | 16 | 1 | 3 |
| LC 423 ⓘ | DC3 Bottoms Level | 100 | 0 | Auto | 0 | 92 | 0 | 8 |
| FC 424 | DC3 Bottoms | 100 | 0 | Cascade LC423 | 92 | 8 | 0 | 0 |
| LC 523 ⓘ | TANK1 Level | 98 | 0 | Auto | 0 | 70 | 1 | 29 |
| FC 524 | TANK1 Outlet | 73 | 0 | Cascade LC523 | 70 | 3 | 10 | 17 |

306 ─→

| ∧ Outputs (17) | |
|---|---|
| Ramp | Tag Name |
| ☐ | FC101.OP |
| ☐ | PC104.OP |
| ☐ | FC4000.OP |
| ☐ | FC220.OP |
| ☐ | FC412.OP |
| ☐ | FC413.OP |
| ☐ | FC422.OP |
| ☐ | PD406.PV |
| ☐ | PD409.PV |
| ☐ | LC411.PV |
| ☐ | PC404.OP |
| ☐ | TC421.OP |
| ☐ | AI414.PV |
| ☐ | AI415.PV |
| ☐ | AI615.PV |
| ☐ | FC414.PV |

All Vectors

| Tag Name | Units | Description | Start Time | Len |
|---|---|---|---|---|
| 08TI201.PV | DEGF | DC3 Tray Top Temp. | 9/7/2014 3:18:00 PM | 739 |
| AI104.PV | % | DC2 Ovhd Propane (LAB) | 9/7/2014 3:18:00 PM | 739 |
| AI1414.PV | % | DC3 Liquid Propane C2- | 9/7/2014 3:18:00 PM | 739 |
| AI1614.PV | % | DC4 Liquid Butane C3- | 9/7/2014 3:18:00 PM | 739 |
| AI1615.PV | % | DC3 Liquid Butane C3- | 9/7/2014 3:18:00 PM | 739 |
| FC101.PV | BPD | DC2 Feed 1 | 9/7/2014 3:18:00 PM | 739 |
| FC124.PV | - | DC2 Bottoms | 9/7/2014 3:18:00 PM | 739 |
| FC124.SP | - | DC2 Bottoms | 9/7/2014 3:18:00 PM | 739 |
| FC220.PV | - | FURN1 Fuel Gas | 9/7/2014 3:18:00 PM | 739 |

305 ─→

300

| ∧ Inputs (13) |
|---|
| Tag Name |
| FC101.SP |
| FC102.SP |
| PC104.SP |
| FC4000.SP |
| TC230.SP |
| FC412.SP |
| FC413.SP |
| TC421.SP |
| PC504.SP |
| FC414.SP |
| PC404.SP |
| FC124.OP |
| LC411.OP |

302 ─→

AUTO-DETECT PID LOOPS

FIG. 3A

SYSTEM AND METHODS FOR AUTOMATED MODEL DEVELOPMENT FROM PLANT HISTORICAL DATA FOR ADVANCED PROCESS CONTROL

RELATED APPLICATIONS

This application claims the benefit of U.S. Provisional Application No. 62/923,046, filed on Oct. 18, 2019. This application also has subject matter related to U.S. Pat. No. 9,141,911, which claims the benefit of U.S. Provisional Application No. 61/646,095, filed on May 11, 2012. The entire teachings of the above applications are incorporated herein by reference.

BACKGROUND

Process engineering industries include those industries involved in petroleum processing, chemical processing, pharmaceutical processing, and the like, each with respective processing plants, factories, and industrial processing systems. In process engineering industries, Advanced Process Control (APC) has progressed over the last three decades and become an industrial standard for achieving stable and safe operation as well as an optimization tool to achieve maximum profit in refineries, petrochemical pants, and other industrial plants. Among APC technology, Multivariable Predictive Control (MPC) is the most widely used, with more than 5,000 worldwide applications currently in service. MPC, which is sometimes also referred to as multivariate control (MVC), employs a model predictive controller that relies on dynamic models of an underlying subject process, e.g., linear models obtained from plant testing data by system identification. The dynamic models: (i) predict the behavior of the subject process, (ii) predict the variations in values of the dependent variables over time, (iii) and make changes to the independent variables, so that the controller can keep the underlying subject process running inside a prescribed constraint set. When inside the constraint set, the MPC also makes changes to the plant processing system and/or subject process relative to the independent variables (MVs), so that the process behavior is optimized (as steady-state targets) based on an objective function.

APC applications commonly include several major steps that an engineer must spend weeks to months on to complete. Traditionally, an APC application project follows the conventional workflow listed below (see FIG. 1A):

(1) Process assessment (economic justification and baselines)
(2) Pre-test (Scope control coverage, fix instrumentation, test design)
(3) Plant Test (Step testing, data collection)
(4) Process modeling (Data Slicing, transforms, model building and identification)
(5) MPC configuration (Initial tuning, profit calculation)
(6) Simulation (Verify performance, adjust tuning)
(7) Commissioning (Online verification, fine adjustments)
(8) Monitoring (Performance monitoring, troubleshooting, model adaptation).

There are several existing major challenges in traditional APC practice. The first is the high costs of APC project implementation due to the number of working hours and expertise required. The second is the undesirable interventions to process production during the Pre-test and Plant-tests stages (steps 2 and 3). The third is that the "entry-level" for a new APC engineer to implement an APC or MPC application is high and requires many complicated technical steps. To address these technical challenges, the Assignee, Aspen Technology, Inc., has developed several innovative approaches over the past years, for example, automated data cleansing and selection (see U.S. Pat. No. 9,141,911, the related application), a new method for non-invasive closed loop step testing (see U.S. Pat. No. 9,513,610) that expanded the automated closed loop step testing techniques in Assignee's U.S. Pat. Nos. 7,209,793 and 6,819,964. Each of the above techniques help in building MPC models and monitoring MPC performances with improved efficiency.

SUMMARY OF THE INVENTION

To further facilitate APC and MPC applications in a new plant or a plant revamp case, a need exists for an innovative system and method for simplifying the initiation of an APC application by building a so-called MPC "seed-model" from massive historical plant operation data. Assignee presents a new APC control paradigm that enables APC engineers to skip-over the listed traditional APC steps 1-3 of FIG. 1A, reduce the interventions to production, save significant APC project costs and speed up the new MPC implementations in an efficient way.

Recently, artificial intelligence (AI), particularly machine learning (ML) and deep-learning neural network (DLNN) approaches (techniques) are advancing rapidly. For example, AI may accomplish tasks that humans do, and accomplish them much better—that is, achieve super-human performance. In the process industry, AI has also been used to attempt to solve chemical engineering problems in three phases over the last three decades (see e.g., Venkat Venkatasubramanian "The Promise of Artificial Intelligence in Chemical Engineering: Is It Here, Finally?" AIChE Journal, Vol. 65-2, pp 467-479). As described by Venkat, previous barriers in conceptual, implementational, and organizational for AI application have diminished with rapid advances in computational power and acceptance of AI-assisted systems. There is a growing need for manufacturing intelligence solutions that makes use of the enormous amount of data in an intelligent manner. For example, a successful application using deep-learning neural network model for automated plant asset failure detection was initiated (see U.S. Pat. No. 9,535,808, which is incorporated herein by reference in its entirety).

The recent advances in AI and ML technology provide new opportunities to address the listed challenges in APC practices mentioned above. For example, techniques of pattern search and recognition have been applied to plant sensor measurements data for process troubleshooting and monitoring (see US Published Application no. 2019/0227504 published on Jul. 25, 2019 and U.S. Pat. No. 10,031,510, which are incorporated herein by reference in their entirety) and a framework and method using AI and ML to solve more general process engineering system (PSE) problems have been developed recently by the assignee (see U.S. Nonprovisional application Ser. No. 16/434,793, filed on Jun. 7, 2019). In this disclosure, a set of new AI algorithms and a computer system are described to address the APC "seed model" building problem, by which large amounts of existing plant historical data can be efficiently mined and re-used for building APC "seed-models", as a result, a new APC project or a revamp of an MPC application can be facilitated in an improved way.

Embodiments of the invention include a computer-implemented method for process modeling and control comprising receiving data comprising process variables for a subject industrial process of a plant, the process variables including an engineering tag and measurements and said receiving being performed by one or more digital processors. The method further comprises creating, from the received data, a working dataset; the creating being automatically performed by the one or more processors. The aforementioned creating including the following steps: (i) identifying, based on associations of process variables and calculated statistics, the process variables that comprise PID loops and cascade control loops and associated loop variable types; (ii) configuring a first set of process variables as independent variables and a second set of process variables as dependent variables of an empty model of the subject industrial process; (iii) searching the measurements of the first set of process variables to identify informative moves for each of the independent variables; and (iv) generating data slices of the received data corresponding to each of the independent variables and at least one of the dependent variables based on the identified informative moves. The created working dataset is formed of and stores the generated data slices.

The method then includes building sub-models for the subject industrial process using the generated data slices stored in the working dataset, the sub-models having various model configurations and the building being implemented by the one or more processors. Next, the method assembles the sub-models in a manner producing a seed model of the subject industrial process, said assembling being automatically performed by the one or more processors. The method concludes by controlling the subject industrial process at the plant based on the produced seed model.

The seed model may be a multivariable process control (MPC) model and the subject industrial process may be controlled by a multivariable process control (MPC) controller. In such embodiments, the step of controlling the subject industrial process may include controlling the subject industrial process based on the produced seed model while configuring a closed-loop testing under the MPC controller. The method may further comprise: (i) performing continuous closed-loop testing; (ii) collecting new data; and (iii) updating the sub-models until a complete MPC model is built and the requirements of a complete model are met for a standard industrial MPC application.

The received data may be historical plant data, usually comprising a plurality of engineering tags, months to years long operational time-series data, one or more gaps (missing values), outliers, bad values or status, frozen-signals, etc.

In some embodiments, creating the working dataset further comprises processing the received dataset including at least one of: identifying bad data segments, repairing some of the bad data segments with estimates, and preprocessing the dataset for model identification.

Identifying the process variables that comprise PID loops and cascade control loops and associated loop variable types may further include applying automated algorithms to classify and infer PID loop and Cascade loop variables based on engineering tag name strings and data statistics. Additionally, configuring a first set of process variables as independent variables and a second set of process variables as dependent variables of an empty model may be based on a received user input.

In some embodiments, creating the working dataset further comprises detecting highly correlated independent variables by performing cross-correlation analysis and removing highly correlated independent variables from the received dataset. In such embodiments, the cross-correlation analysis may include projecting the process variable measurement data onto a latent space and applying machine-learning data clustering analysis on the projected dataset In some embodiments, creating the working dataset further comprises performing a nonlinearity analysis on each of the dependent variables versus the independent variables and applying a nonlinear transform to a detected nonlinear dependent variable. In such embodiments, the nonlinearity analysis may include a) iteratively building a linear model via subspace identification; b), generating model predictions with the identified linear model; c) comparing predictions against raw measurements; d) calculating deformation values; and e) applying a test nonlinear transform. Additional nonlinearity analysis may be repeated until an optimal nonlinear transform is found and applied.

In some embodiments, creating the working dataset further comprises defining a specific time-series key performance indicator sensitive to the informative moves, based on calculation of a time-series matrix profile with a moving window and wherein searching the measurements of the first set of process variables uses the defined specific time-series key performance indicator. In such embodiments, the specific time-series key performance indicator may be defined as $$KPImoves = \frac{\sqrt{\int_1^n \Delta x^2}}{n^p}$$

where $\Delta x = x(t) - x(t-1)$, n is the length of a moving window, and p is $0 \leq p \leq 5$.

The searching of measurements may include applying datamining steps to automatically search the measurements of the first set of process variables to identify informative moves for each of the independent variables. Those datamining steps may include any of: a) calculating a key performance indicator vector for each of the independent variables; b) rescaling the key performance indicator vectors resulting in a group of scaled key performance indicator time series; and c) screening the key performance indicator time series and marking measurements associated with the key performance indicator time series exceeding a threshold as containing the informative moves.

The variable model configurations may include at least one of SIMO, SISO, MISO, and MIMO.

The step of assembling may further comprises identifying relatively higher quality sub-models based on iterative model identification and optimal model selection, the relatively higher quality sub-models being used in said assembling to produce the seed model.

The method may further comprise collecting from the plant online testing data and repeating sub-model identification to update the seed model until the seed model converges to a stable model of the subject industrial process.

A computer-based system of advance process control, the system comprising a source of historical plant data of a subject industrial process at an industrial plant, the historical plant data comprising process variables of the subject industrial process, each process variable including an engineering tag and measurements related to at least one component of the subject industrial process. The system also including a data analyzer communicatively coupled to the source, the data analyzer executed by a processor. The data analyzer forming a working dataset from the historical plant data by automatically: (i) screening engineering tags and identifying PID loops and CASCADE control loops based on associations of process variables and calculated statistics, (ii) determining independent process variables indicative of manipulated variables (MVs), and determining dependent process variables indicative of controlled variables (CVs) to configure an MPC controller, (iii) searching plural historical time-series of the measurements and identifying informative "moves" for each independent process variable, and (iv) generating informative data slices of the historical plant data corresponding to each MV and selected CVs, the generated data slices being stored in the working dataset. The system further including a seed model builder engine coupled to receive the working dataset from the data analyzer, the seed model builder engine: (i) building sub-models for the subject industrial process using the generated data slices stored in the working dataset, including running subspace identification in various model configurations to obtain the sub-models, and (ii) assembling the sub-models in a manner producing a seed model representative of the subject industrial process for initiating the MPC controller, the MPC controller being deployed with the produced seed model and controlling the subject industrial process at the plant.

The system may further include a data preprocessor coupled between the source and the data analyzer, the data preprocessor cleaning the historical plant data by identifying bad data slices and repairing some bad data slices with interpolations or model predictions.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION OF THE INVENTION

A description of example embodiments follows.

Example Multivariate Modeling and Control System

Figure 1A:
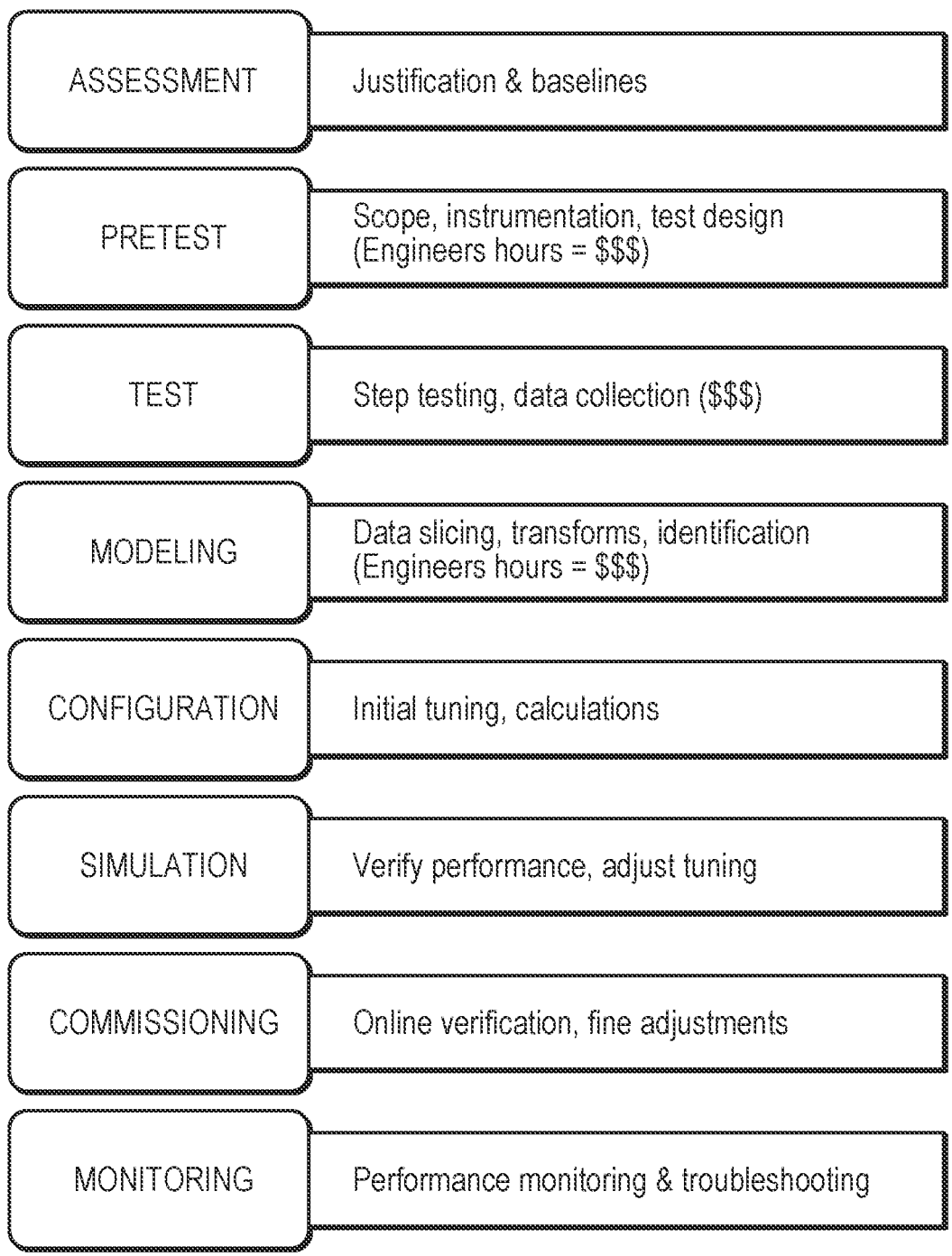
FIG. 1A illustrates a conventional APC application workflow.

FIG. 1A illustrates a conventional APC application workflow 100. Initial steps, Assessment, Pretest Test, and Modeling, generate a model of a subject process. The model predicts the behavior of the process under inputted conditions. The intermediate steps, Configuration, Simulation, and Commissioning, test and adjust the model to ensure that it best represents the subject process. The final step, Monitoring, ensures that the model continues to accurately predict and represent the subject process.

Figure 1B:
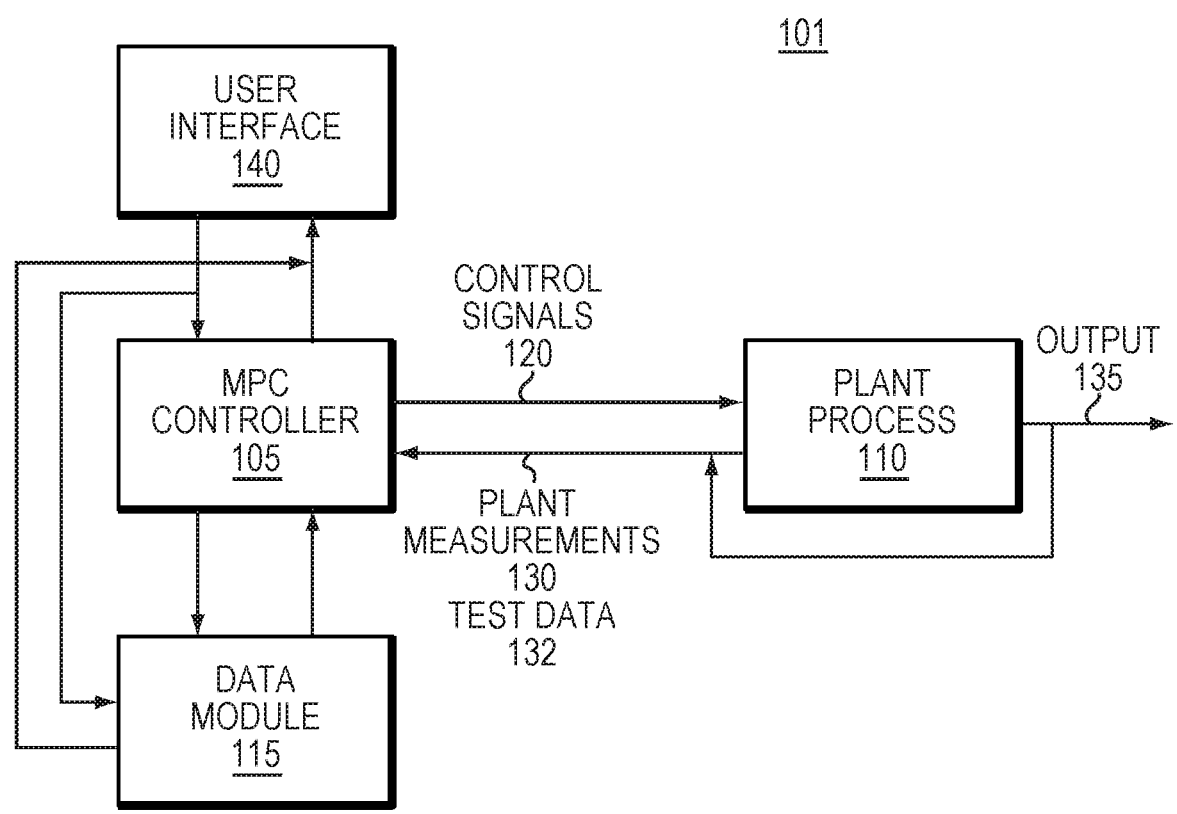
FIG. 1B is a schematic view of an example multivariate modeling and control (MVC) system for executing some embodiments of the present invention.

FIG. 1B is a schematic view of an example APC multivariate control modeling and control system 101 for executing some embodiments of the present invention. In the embodiments of FIG. 1B, the multivariate modeling and control system 101 includes a user interface display 140, that is communicatively connected to a MPC controller 105 and automated data selection and on-line model identification module (data module) 115. The interface connection between the user interface display 140 and each of the MPC controller 105 and data module 115 may be a wired connection such as in a plant distributed control system (DCS) or wireless connection, such as internet, WiFi, or Bluetooth. In some embodiments, as shown in FIG. 1B, the MPC controller 105 and the data module 115 may be configured as separate subsystems of one or more processors for controlling and modeling a plant process 110. In these embodiments, the MPC controller 105 and the data module 115 may be communicatively coupled by a wired in connection such as a plant distributed control system (DCS) or wireless connection, such as WiFi or Bluetooth. In other embodiments, the data module 115 may be configured as part of the MPC controller 105 subsystem, which is implemented as one or more processors for controlling and modeling a plant process 110. The MPC controller 105 is further communicatively connected to the plant process 110 (of a physical plant, such as a petrochemical plant, chemical processing plant, or the like).

The data module 115 generates at least one of linear and non-linear models (MPC models) for defining and predicting the behavior of the plant process 110. Data module 115 may execute method 1000 of FIG. 2A to create a MPC "seed model" (an initial dynamic model) based on historical data.

Data module 115 may further refine, alter, and/or update the created MPC "seed model" based on measurements 130, test data 132, and/or by utilizing APC steps method workflow 100 shown in FIG. 1A. In addition to creating MPC "seed models", data module 115 generates working and updated MPC models based upon the created MPC "seed model." By utilizing method 1000 of FIG. 2A, Data module 115 is capable of creating MPC models faster, with less intervention to the production, and with less engineering overhead, involvement, and/or training than traditional APC methods.

The MPC controller 105, communicatively coupled to the data module 115, uses the generated MPC models to predict, optimize, and control the future behavior of the plant process 110. In example embodiments, the MPC models generated at data module 115 for optimization of the plant process 110 may include objective functions that determine steady-state targets defining the optimal behavior (operation and output) of the plant process 110 based on cost factors. The data module 115 may provide parameters for a user or system to define the behavior of the plant process 110 as a generated MPC model, including parameters for defining independent and dependent variables of the plant process 110 and defining optimization giveaway tolerance for each variable. These parameters may be displayed at user interface display 140 for the user or system to define the MPC model for the plant process 110. The data module 115 may also define the behavior of the plant process 110 where generated MPC models are based in part on plant measurements 130 and test data 132 (e.g., from plant process output 135) received at the MPC controller 105 from the physical plant, historical process data (e.g., from a historian database), and such. In some embodiments, the generated MPC models, MPC "seed models," or provided parameters may be stored in memory at, or communicatively coupled to, data module 115, and may be loaded to the data module 115 at a later time for defining the behavior of a plant process 110.

The MPC controller 105 loads and feeds process measurements into the generated MPC models to predict the future behavior of the plant process 110, as defined by dependent variable values, in response to changes in the process conditions, as determined from plant measurements 130, test data 132, and other plant process output 135 received from independent variable values of the plant process. The MPC controller 105 also loads and runs the generated MPC models to optimally adjust the plant process 110, by adjusting the independent variables, in response to the plant process output 135, control objectives, and modeled predictions. Specifically, generated MPC models may be used to optimally adjust the independent variables to ensure that the plant process 110 continues to run with the most optimal economic benefit possible inside a prescribed constraint set.

The MPC controller 105 transmits control signals 120 comprising control moves to the plant process 110 (at the physical plant) to push the plant process 110 (e.g., program components at the physical plant based on the adjusted independent variables) towards the configured optimized behavior. The physical plant is generally configured with a distributed control systems (DCS) or other plant process control system that adjusts (control moves) the plant process 110 based on the control signals 120. The DCS transmits plant measurements 130, testing data 132, and other process output 135 of the plant process 110 back to the MPC controller 105 for further predictions and optimization of the plant process 110.

Example Plant Process Control

Figure 1C:
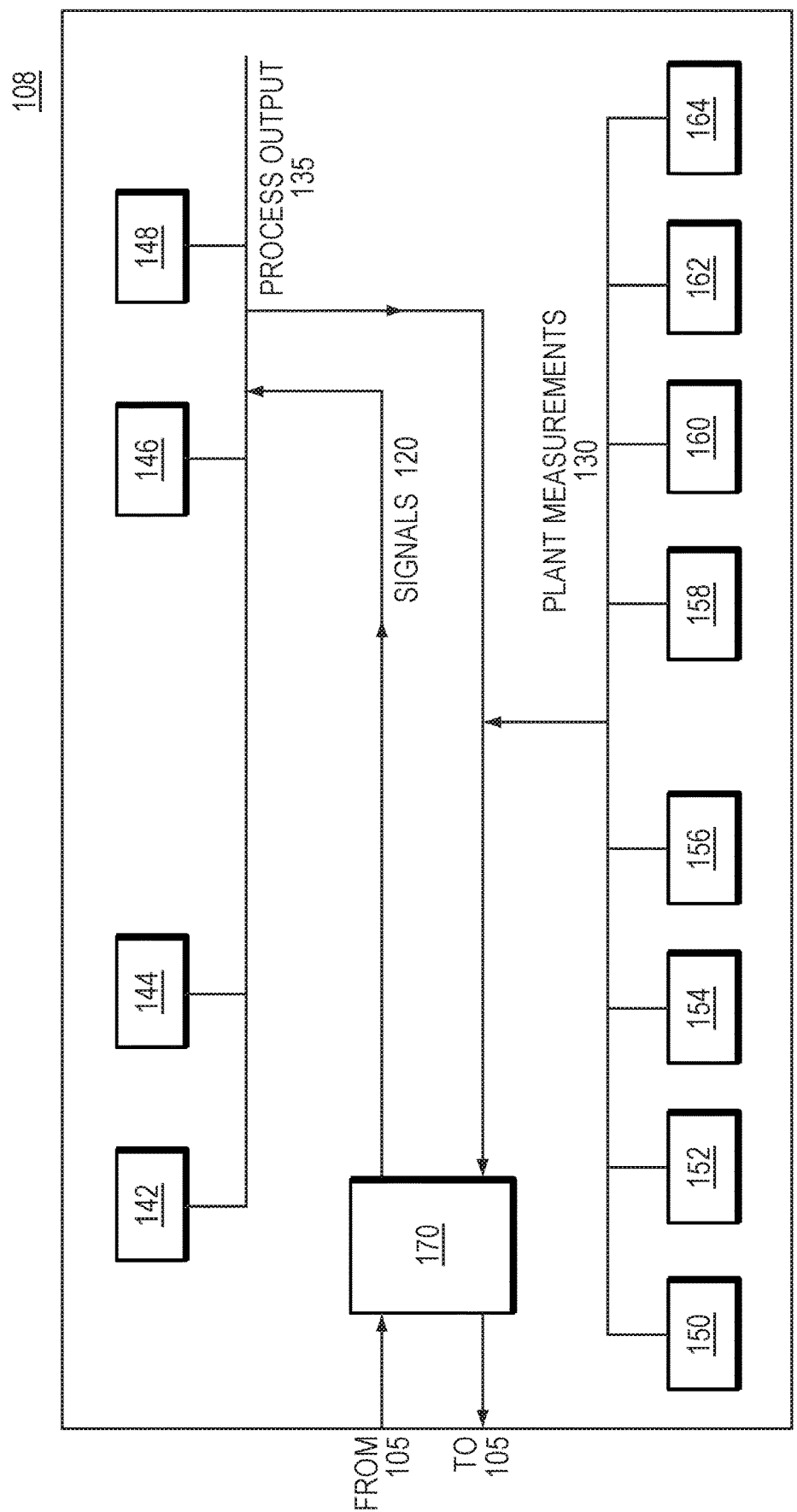
FIG. 1C is a schematic view of an example process unit for measuring and controlling a plant process in embodiments of the present invention.

FIG. 1C is a schematic view of example process unit 108 containing plant equipment for measuring and controlling the plant process 110 in embodiments of the present invention. A plant process 110 is generally performed in a physical plant configured with one or more plant process control systems (or distributed control system (DCS) systems) 170 to measure and control the plant process 110. In FIG. 1C, the plant process control system 170 is configured (and equipped) to take plant measurements 130 of the parameters associated with the plant process 110, such as temperature, pressure, and flow. Specifically, the plant process control system 170 communicates with physical sensors configured at the plant to determine the current plant measurements 130 associated with the plant process 110. For example, the plant process control system 170 may communicate with flow meter 150 to determine column jet flow associated with the plant process 110, pressure sensor 152 to determine column overhead pressure associated with the plant process 110, temperature sensor 154 to determine column overhead temperature associated with the plant process 110, and temperature sensor 156 to determine feed stream temperature associated with the plant process 110. For further example, the plant process control system 170 may also communicate with flow meter 158 to determine heater feed pass flow associated with the plant process 110, pressure sensor 160 to determine fuel gas pressure associated with the plant process 110, pressure sensor 162 to determine steam pressure associated with the plant process 110, and pressure sensor 164 to determine reflux drum pressure associated with the plant process 110.

The plant process control system 170 may be further configured to transmit the plant measurements 130 determined by the physical sensors 150, 152, 154, 156, 158, 160, 162, and 164 to the MPC controller 105. The MPC controller 105 may use the transmitted plant measurements 130 in the generated MPC models to determine the current behavior associated with the respective independent variables (e.g., column jet flow, column overhead pressure, column overhead temperature, feed stream temperature, and heater feed pass flow) and respective dependent variables (e.g., fuel gas pressure, steam pressure, and reflux drum pressure) of the plant process 110. Based on the plant measurements 130, the MPC controller 105 may make updated predictions for the future behavior of the plant process 110 and further adjust the independent variables to optimize the behavior of the plant process 110. The plant measurements 130 may also be collected to form a historical dataset for plant process 110. System 101 may use the collected historical dataset to generate a MPC "seed model" or model based upon a MPC "seed model" to model and control plant process 110.

The MPC controller 105 further transmits control signals 120 to the plant process 110 (at the physical plant) configured to push the plant process 110 (e.g., program components at the physical plant based on the further adjusted independent variables) towards the optimized behavior. The plant process control system 170 receives the control signals 120 and is configured (and equipped) to adjust (program) physical components of the plant, such as an actuator 142, valve 144, pump/compressor 146, and gauges 148, in accordance with the further adjusted independent variables. The plant process control system 170 may capture the updated settings of the adjusted physical components (actuator 142, valve 144, pump 146, and gauges 148), as part of the process output 135, along with updated plant measurements 130 from the physical sensors 150, 152, 154, 156, 158, 160, 162, and 164. The plant process control system 170 may, then, transmit the updated plant measurements 130 and process output 135 to the MPC controller 105 to be used by the MPC models for further prediction and optimization of the plant process 110.

Generating an APC "Seed Model"

Over the last three decades, MPC implementation has become a standard of Advanced Process Control (APC) in refineries and petrochemical plants. Chemical and petrochemical manufacturers have benefitted from those technology advances resulting in improved profit margin, production safety, and high product quality. These benefits are mainly attributed to technology advances in improved MPC process testing (see U.S. Pat. No. 6,819,964; #7,209,793; #9,513,610), modeling (see U.S. Pat. No. 9,141,911; #7,231,264; #9,727,035), tuning of model-predictive-control (see U.S. Pat. No. 10,082,773), online monitoring as well as model self-adaptation and sustained performance (see U.S. Pat. No. 8,560,092). With all the above technology advances, an initial MPC model (i.e. a "seed-model" for MPC) is still needed and it is typically built through a pre-test in the plant process with common or state of the art techniques. Such a typical pre-test on a plant process requires APC engineers working on site from weeks to months, depending on the size of the underneath industrial process. Interventions to the production process are also unavoidable and both will be counted as a big portion of the costs of MPC applications.

Recently, with the emergence of artificial intelligence (AI), particularly time-series data mining and machine learning, the process industry has an opportunity to benefit by use of AI techniques in further automation in MPC implementation. This disclosure presents such an example that a "seed-model" (initial dynamic model) for MPC application can be built from historical plant operation data by use of self-learning of process knowledge and an improved time-series data-mining approach in a synergistic manner with prior inventions of the assignee.

Figure 1D:
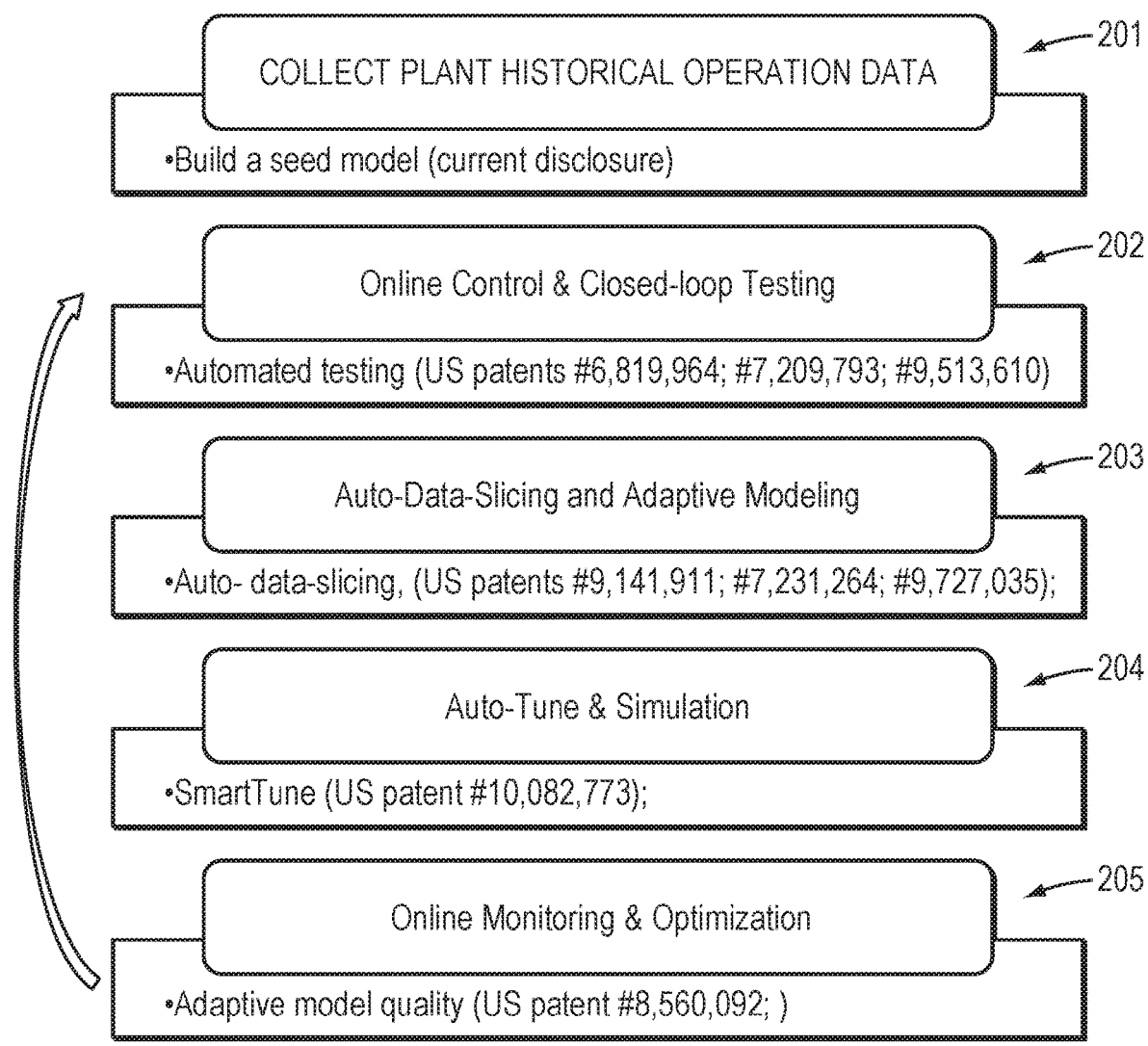
FIG. 1D illustrates a number of recent innovations to support the best practice in each of the steps of an APC application in embodiments.

FIG. 1D illustrates a number of recent innovations to support the best practice in each of the steps of an APC application 200. As shown in FIG. 1D, once an initial MPC model as "seed-model" is available, an APC engineer may complete the MPC application iteratively by using the various techniques developed previously. For example, the engineer may (1) start with an approximate (not necessarily perfectly accurate) "seed-model" generated from historical data 201; (2) setup an initial MPC controller with configured closed-loop testing actions using a non-invasive close-loop testing technique (see U.S. Pat. No. 9,513,610, which is incorporated herein by reference in its entirety) 202; (3) over days to a week, generate a new dataset using automated testing and data slicing programs 203; (4) update the approximate MPC "seed-model" using a special model identification technique (see U.S. Pat. No. 9,727,035, which is incorporated herein by reference in its entirety) 203; (5) an APC engineer may further evaluate the MPC models' quality with the techniques disclosed in U.S. Pat. No. 8,560,092, (which is incorporated herein by reference in its entirety) 205; (6) if the updated/re-identified MPC models/sub-models reached at the pre-defined model qualities with a measurement such as model accuracy in predictions and model uncertainties, the APC engineer may stop the update of those models/sub-models 204; and (7) the APC engineer may further extend the auto-testing and model update to other sub-models of a MPC controller for a large MPC application 205. Applicant's current disclosure provides an inventive system and method 201 for Step (1) which can utilize in combination with any amount of the techniques 202, 203, 204, and 205 in Steps (2) to (7) or disclosed in the patents cited in FIG. 1D (which are incorporated herein by reference in their entirety).

The currently disclosed system and methods help APC engineers to build a MPC "seed-model" from existing plant historical operation data rather than going to the site to conduct a traditional "pre-test" which incurs high costs and interferes with plant production. However, dealing with historical plant data creates issues that need to be addressed including: (a) because plant operational data is massive and "dirty", an automated data cleansing system is required; (b) typical plant operation measurement data may contain one or more PID loops and/or cascade control loops, and each PID control loop contains three types of measurements, setpoint (SP), process variable (PV), and output variable (OP). Because only SP data are appropriate to be used as independent variables in a seed model for MPC application, PID loops and/or cascade control loops and their measurement types need to be identified; (c) because historical datasets contain less useful informative "moves" than those obtained from specifically designed plant tests with input perturbations of a traditional "pre-test", the direct use of such dataset for model identification will fail to create useful MPC models. Additionally, manual selection of data slices among numerous process variable measurements over a long history is extremely time-consuming and requires expertise. Therefore, an efficient autonomous data mining algorithm is needed to search and identify useful data segments (slices over a long time series); and (d) data selection process and seed-model identification cannot reach an optimum by one-pass, thus it may need multiple iterations of "data-selection, modeling, assessment, re-try, etc."

Prior art approaches to solving the problems described above usually require manual, lengthy and expensive plant testing and production interventions. It is not unusual for the typical plant pre-test to require weeks to months of an engineer's time to get the model built and validated. In fact, there are large amounts of historical plant operation data available in every refinery or chemical plant. For most times, those historical plant operation data are recorded at or around a so-called "steady-state" of the process, and mostly under closed-loop control, therefore, directly applying prior model identification technology to such "steady-state" operation data, may fail to generate useful models due to the lack of informative data representing the correlations between inputs and outputs of a process.

With the disclosed approach utilizing AI techniques, it becomes feasible to automatically screen process variables using tags and identify existing PID and cascade control loops and the corresponding SPs. It also becomes feasible to search the time-series over a variable's long history and identify data slices that may be rare and small, but contains useful informative "moves" for building MPC models. By using those identified limited amount of data slices, at least one or more MPC sub-models can be estimated and an initial MPC controller can be configured to run online. Further, using the previously disclosed technique of "non-invasive closed loop step testing using a tunable trade-off factor" by the assignee (described in U.S. Pat. No. 9,513,610, for non-limiting example, which is incorporated herein by reference in its entirety) the MPC controller 105 may persistently perform closed-loop step-testing while still controlling the plant production process, and such an initial MPC controller will not necessarily require an accurate "seed-model" to start with. Practices in different plant historical datasets have proved the effectiveness of Applicant's new technique and the great value of utilization of historical plant operation data for new or revamped APC applications.

This disclosure addresses the challenges listed above and offers innovative solutions that may include the following major steps:
(1) Loading historical plant operation data into a system and creating a raw time-series dataset for the subject process under consideration for implementing a MPC application;
(2) Identifying PID and cascade control loops and the associated SP, PV, and OP variables among the plant dataset of measurements;
(3) Configurating an initial MPC controller skeleton model by user specifying a set of process variables as inputs (independent variables) and a set of process variables as outputs (dependent variables) from the raw time-series dataset;
(4) Running a data-cleansing module to identify, slice-out, and repair "bad" data among the raw measurements of process variables selected for MPC inputs and outputs in an automated and efficient way;
(5) Creating a clean dataset after the data cleansing and repairs;
(6) Applying a pattern-search based data-mining algorithm to each process variable and identifying data slices in the clean dataset with useful informative "moves" data sections for building MPC "seed-models";
(7) Offering a tuning parameter to allow users to change a threshold of "data-moves" selector for adjustable data selection;
(8) Building MPC "seed-models" block-by-block and iteratively by selecting more-or-less data amounts to obtain a subset of best possible "seed-models";
(9) As a result, models or sub-models with optimal predictions and minimum uncertainties are built with the given plant historical data and as a "seed-model" to be used in the MPC controller for the MPC application 200 as illustrated in FIG. 1D.

The computer system and method described in this disclosure offers several advantages over prior art. Embodiments encompass better technology, and specifically make use of the existing available process tags and historical plant operation data for MPC modeling and control. Embodiments extract and use the information contained in the historical plant data, and support improved workflows and close the loop of a new APC control paradigm. Embodiments of the present invention automate best practices and aid management of the model over its entire lifecycle. Furthermore, the automated workflow of the present invention not only lowers the barrier for junior APC engineers to implement APC applications, but also avoids an expensive plant pre-test and undesirable production interventions to the subject process 110. Many refineries and chemical operating companies have invested tremendously in developing a large number of MPC applications. The technology presented here by Applicant can leverage these existing MPC implementations (e.g. revamps) in a very efficient manner.

The present invention provides a computer system and methods for developing an initial dynamic model ("seed-model") from plant historical data of a plant process 110 for a MPC controller 105 to start a self-learning process. In embodiments. the system includes a data loader, a data pre-processor, a PID loop analyzer, a time-series data miner, a model builder, a historical database and complete procedures to build and deploy a MPC controller 105. The system may be a multivariate control modeling and control system 101 as shown in FIG. 1B. Alternatively, the system may build the MPC controller 105 separately from multivariate control modeling and control system 101 and deploy the MPC controller 105 in system 101 after it is built. In some embodiments data module 115 contains the data loader, the data pre-processor, the PID loop analyzer, the time-series data miner, and the model builder. In alternative embodiments the aforementioned components are separate from the data module 115. The historical database may be constructed from measurements 130 of plant process 110 collected by process unit 108. The historical data usually comprises plenty of engineering tags, months to years long operational time-series data, one or more gaps (missing values), outliers, bad values or status, frozen-signals, etc.

The methods of the present invention have four primary phases: data loading and data cleansing, PID loop analysis, data mining and selection for seed-model building, and model identification and MPC deployment. An overview of each phase for a non-limiting example embodiment is described below.

In the data loading and data cleansing phase, a raw dataset is generated, by the system 101, from historical data. The raw dataset contains process variables of plant process 110. The raw dataset may contain some bad quality measurements including, but not limited to, missing values (gaps), frozen signals (constant values crossing over a period), short-term outliers, and values that are out of high/low process limits or highly noisy in the continuous measurements of process variables. The system 101 performs data pre-processing, which includes data screening, repairing, and other preparation such as filtering, aggregation etc. An automated data screening and slicing technique (described in U.S. Pat. No. 9,141,911, for example, which is incorporated herein by reference in its entirety) may be applied to the dataset for bad data identification and data cleaning.

In the PID loop analysis phase, the system 101 screens all available process variable tags and runs an algorithm to identify all existing PID loops and cascade control loops to help a user to configure the new MPC's inputs and outputs (independent and dependent variables). The system receives model configuration information from a user and a database through a modeling agent that guides the user through a sequence of workflows. The modeling agent prompts the user at each workflow to enter further information required for the configuration, such as specifying a set of inputs and outputs for the initial MPC model. In response, the modeling agent saves that information in a suitable format in one or more configuration files.

In the data mining and data selection phase, the system 101 applies a special AI data mining algorithm to the cleansed dataset created by the first two phases. As a result of the applied AI data mining, a relatively small portion of data slices with useful "moves" are automatically identified and selected by system 101 to use for MPC "seed-model" building. A tunable parameter ($0<\alpha<1$) is available, as a data-miner's "knob" or control mechanism for a user to adjust the sensitivity on data slicing selections.

In the MPC model building phase, model identification cannot be performed in a traditional way as for plant test datasets, i.e. performing multi-input, multi-output (MIMO) or multi-input, single-output (MISO) model identification with one pass for a process. Instead, the system 101, limited by the amounts of "informative data" found in the data slices of the historical data, can only create sub-models. Therefore, the system 101 has to try multiple input-output configurations and perform multiple single-input, single-out (SISO) or single-input multi-output (SIMO) model identifications to obtain a "seed-model" of the MPC controller 105 based on the created sub-models. Each identified "seed-model" is further validated by system 101 through simulation and model predictions over the selected and unselected time-series data. Iterative data-slicing and sub-model identifications may be required for an optimum result in "seed-model" building and the system 101 provides such methods to help APC engineer users.

After system 101 obtains a "seed-model" as described above, an initial MPC controller 105 can be configured and deployed by the system. The system 101 allows APC engineers to further switch modes of the MPC controller 105 to a "calibrate" mode. In calibrate mode of the MPC controller 105, the system 101 enables users to inject random input moves while controlling the process production operation. The system 101 can apply to MPC controller 105 a technique for non-invasive closed loop step testing using a tunable trade-off factor (described in U.S. Pat. No. 9,513,610, for non-limiting example, which is incorporated herein by reference in its entirety), and can continue to collect "fresh" process time-series data with informative "moves."

With new accumulated "fresh" process historical data under a persistent perturbation by the MPC controller 105 in "calibrate" mode, the system 101 allows APC engineers to repeat the data pre-processing and model building described herein, and as a result, the initial MPC "seed-model" can be updated with new data and rapidly converged to an optimal model in terms of improved model predictability and minimum model uncertainty.

Systems and methods are disclosed for a new paradigm of APC practices. An example workflow 1000 for building and deploying APC seed models is provided in FIG. 2A. Embodiments provide expansion of automated data cleansing and selection in model identification and adaption in multivariable process control (MPC) techniques described in related patent (U.S. Pat. No. 9,141,911 by Assignee). Rather than doing a plant pre-test onsite for building APC seed models, the embodiments of the present invention help APC engineers to build APC seed models from existing plant historical data with self-learning automation, pattern recognition, and additional AI techniques. Embodiments may further provide a system and method for "growing" and "calibrating" the APC seed models online with the "non-invasive closed loop step testing using a tunable trade-off factor" (described in U.S. Pat. No. 9,513,610, which is incorporated herein by reference in its entirety). Embodiments can be configured and executed to search and identify PID loops and associated SP, PV, and OPs, screen, identify and select only "informative moves" data among the long history of process variables for seed model development and MPC application, while skipping the costly traditional pre-testing steps and minimizing the interferences to a production process. Accordingly, the present invention provides a significant improvement on MPC implementation practice and APC project margin over the state of the art.

Embodiments provide a new system and methods for self-learning of PID loops, automatically screening and selecting useful data slices from massive plant historical operation data for building seed models for multivariable predictive controller (MPC) applications 200. Below, an overview of system workflow and system elements are provided, followed by a discussion of operational modes, process modules/methods and mathematical details.

Embodiments may include, for example, loading and cleansing plant historical data, then searching and identifying existing PID loops and cascade control loops, then applying specific AI pattern search algorithms to find "informative moves" contained in those SPs from massive historical data and creating one or more data slices. An APC seed model can be built from many of the identified informative data slices, and an optimal seed-model can be determined by iterative sub-model identification, model integration and comparisons automated with a special seed-model identification workflow. Embodiments may further include MPC configuration with a seed model and the expansion of a seed model online with the technique "non-invasive closed loop step testing using a tunable trade-off factor" (described in U.S. Pat. No. 9,513,610, which is incorporated herein by reference in its entirety).

APC Seed-Model Development Workflow and System 1000

Figure 2A:
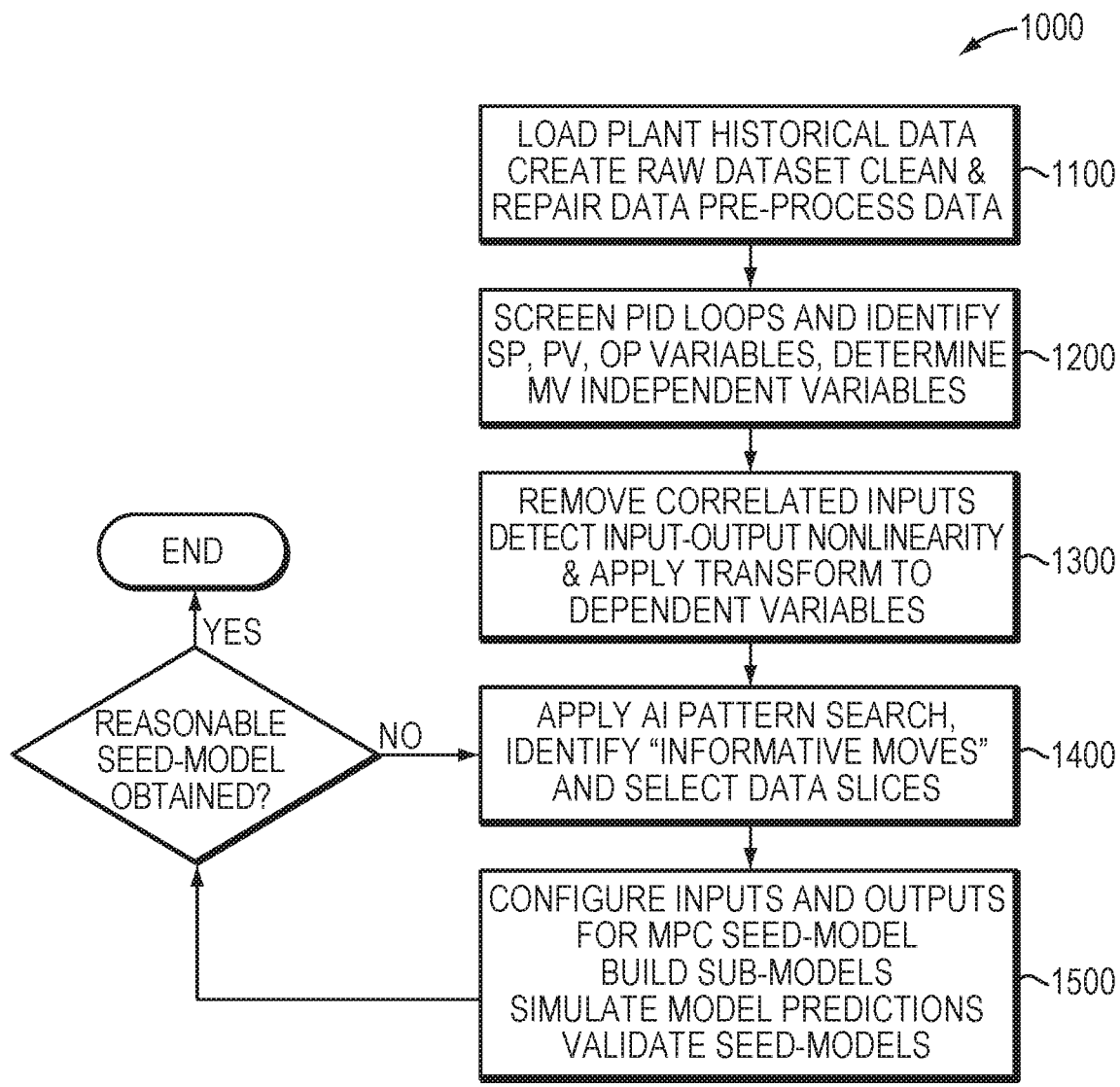
FIG. 2A is a flow diagram illustrating an example method for building and deploying a MPC seed-model (an initial dynamic model) from historical plant data, according to an example embodiment.

FIG. 2A illustrates an example method 1000 of building and deploying an APC seed model to initiate a MPC implementation in an industrial process. In the example method 1000, the first step 1100 includes generating a dataset by loading a set of process variables of a subject industrial process. Each process variable includes historical measurement records related to at least one component of the subject industrial process. The first step 1100 also involves providing data pre-processing, which includes data screening, repairing, and other preparation such as filtering, resampling, etc. One non-limiting example of data pre-processing includes applying an automated data screening and slicing technique (described in U.S. Pat. No. 9,141,911, for example, which is incorporated herein by reference in its entirety) for bad data identification and data cleansing. The first step 1100 transforms the historical measurements of a raw dataset of the process variables of a subject industrial process into a cleaned dataset for use in the next steps of method 1000. Further details are discussed below in FIG. 2B.

The example method 1000 second step 1200 facilitates MPC configuration. In particular, step 1200 provides APC engineers with a PID loop analysis procedure, that helps search existing PID loops and cascade control loops, identifies associated SP, PV, and OPs, and assists with configurations of an MPC controller. FIGS. 2C and 2D (discussed below) further detail step 1200.

The third step 1300 further adjusts the dataset created by first step 1100 and second step 1200, and removes correlated inputs and detects and corrects input-output nonlinearity. Step 1300 may apply transforms to some process output variables and use transformed output variables as dependent variables of a seed-model. Further details of step 1300 are discussed below in FIG. 2E.

Based on the MPC configuration, for the cleaned, repaired, and corrected dataset, resulting from first step 1100, second step 1200, and third step 1300, the method 1000 fourth step 1400 provides an efficient method to identify and select "informative moves" data from the massive historical plant measurements. Step 1400 marks the automatically selected data segments as good data slices that are useful for building seed models to initiate a new MPC implementation for the subject industrial process. Fourth Step 1400 is further detailed below in FIG. 2F.

The example method 1000 further provides fifth step 1500 formed of specific modeling techniques that are different from traditional multi-input single-output (MISO) and multi-input multi-output (MIMO) model identification found in the prior art. Instead, the embodiments provide an automated seed-model building method by running one or more sub-model identifications with single-input multi-output (SIMO) and single-input single-output (SISO) configurations combined with multiple iterative optimizations on the final seed-model determination. Once step 1500 fills a MPC model matrix (controller's inputs vs. outputs, initially empty) with one or more sub-models obtained, depending on the availability of useful data slices identified with "informative moves" during fourth step 1400, a MPC controller can be configured and initialized with the seed-model and execute MPC control and continued closed-loop plant testing with the techniques recently disclosed by the assignee, i.e. "non-invasive closed loop step testing using a tunable trade-off factor", described in U.S. Pat. No. 9,513, 610, which is incorporated herein by reference in its entirety. Discussed below, FIG. 2G further details step 1500, and FIG. 2H further details online adaptation of a seed model of the present invention.

Data Cleansing and Pre-Processing (First Step 1100)

Figure 2B:
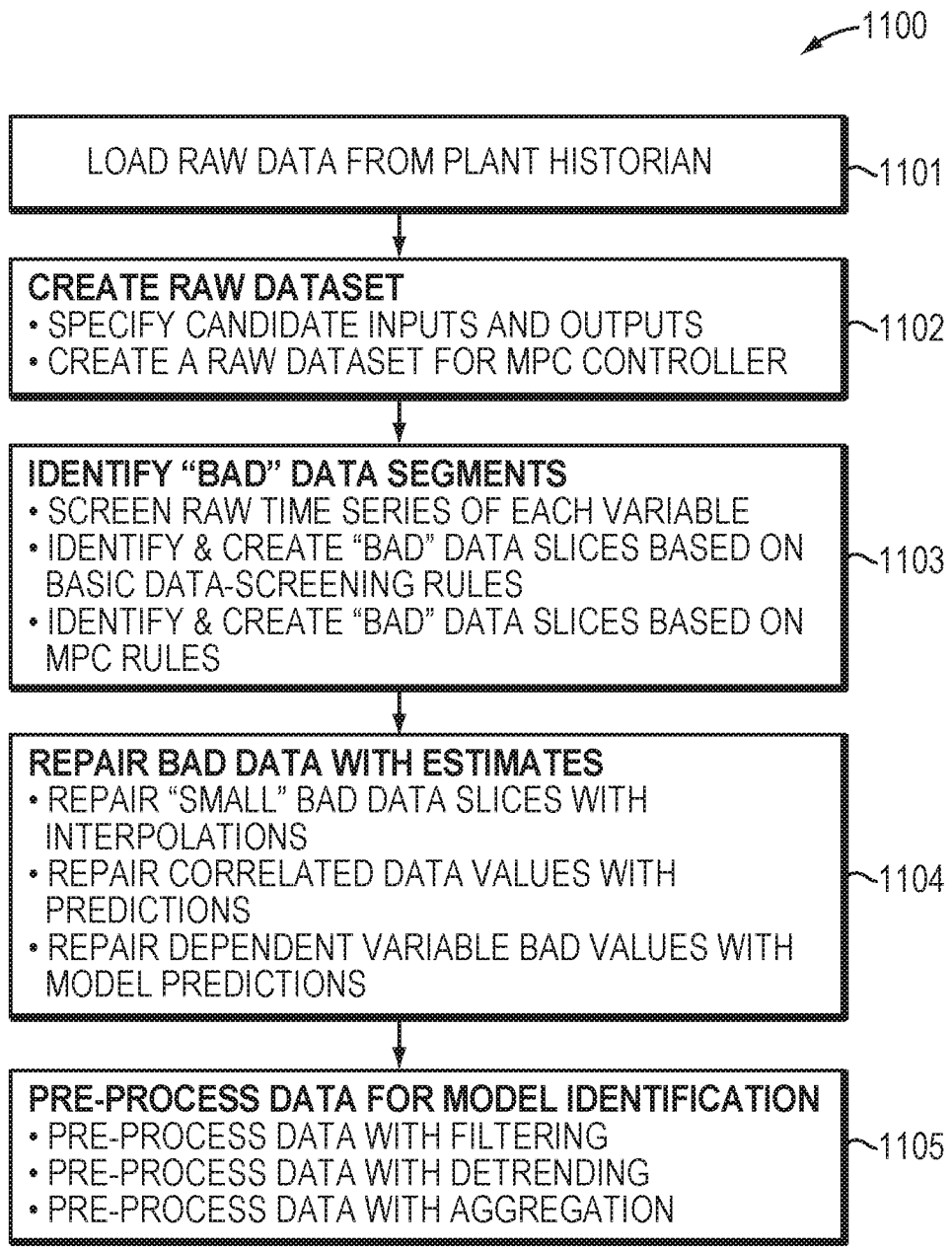
FIG. 2B is a flow diagram illustrating data loading, cleansing, and pre-processing according to the example embodiment of FIG. 2A.
Figure 2C:
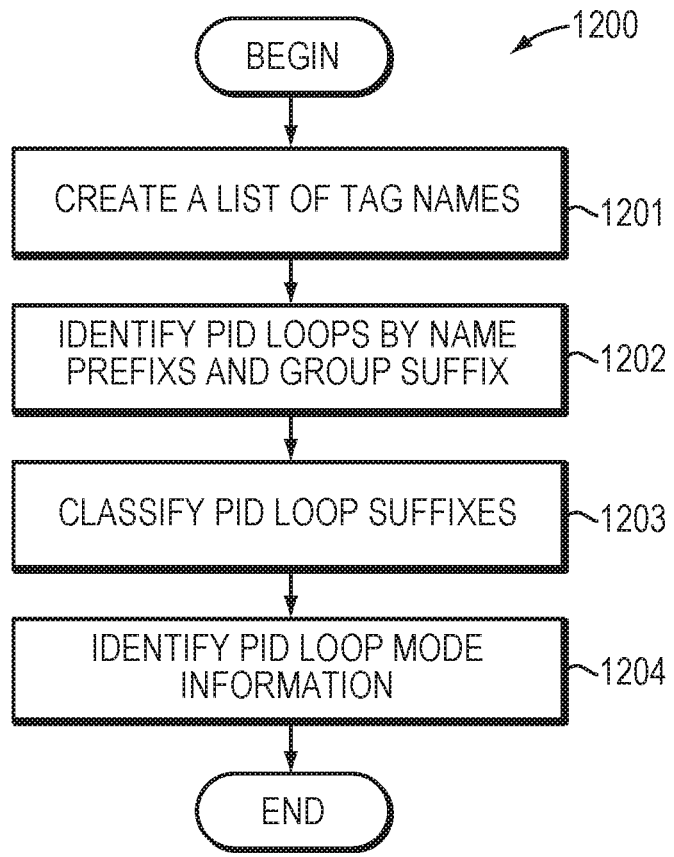
FIG. 2C is a flow diagram illustrating PID control loop searching among the process variable tags to the example embodiment of FIG. 2A.
Figure 2D:
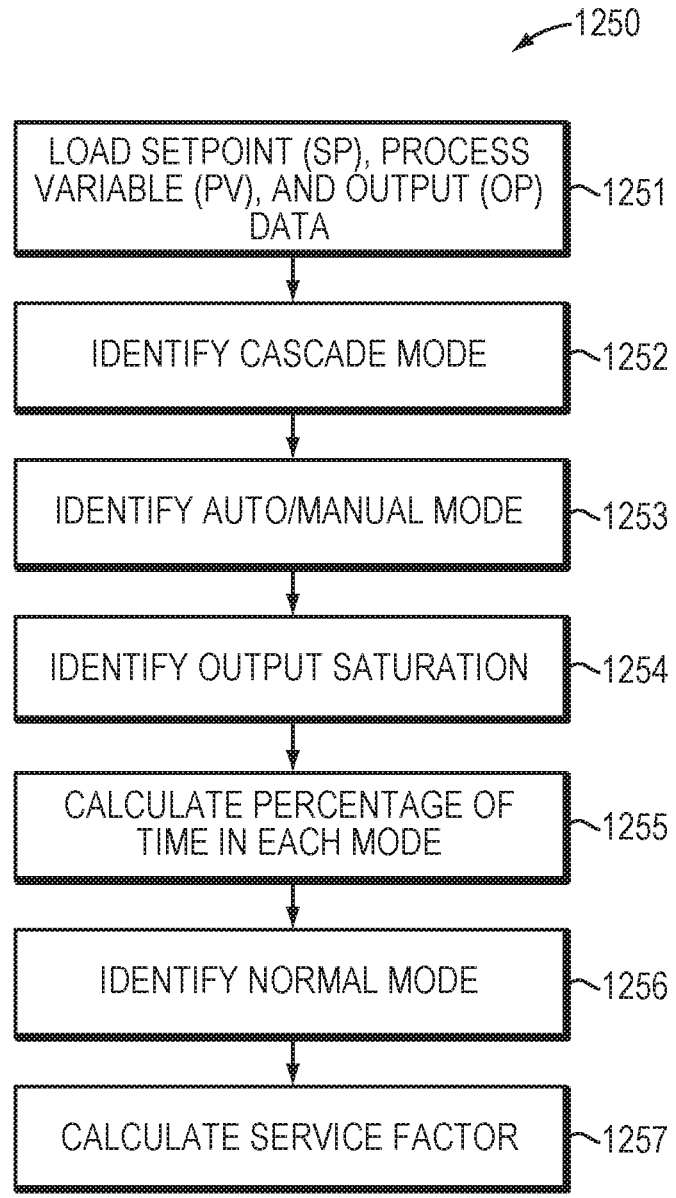
FIG. 2D is a flow diagram illustrating cascade control loop searching among the process variable tags to the example embodiment of FIG. 2A.

FIG. 2B is a flow diagram depicting the workflow of first step 1100 in an example embodiment (seed model development method and system 1000) of the present invention. The plant raw data is first loaded 1101 from plant historian, or another source. The raw data may contain tens to hundreds of process variables for a subject process involved in a typical MPC application 200. The system 1000 (at step 1102) allows a user (through a UI) to specify or select a set of process variables (e.g. engineering tags) as candidate inputs and outputs of the MPC controller, and to create a raw dataset from the loaded plant data. The system 1000 (at step 1103) then screens the raw time-series data of each loaded process variable's measurements. Step 1103 may utilize an auto-data-slicing technique (see e.g., U.S. Pat. No. 9,141, 911) for an automated data cleansing, or alternative data screening method. In step 1103, bad data, including but not limited to, missing data (e.g., gaps), freezing signals (constant values crossing over the whole history), and outliers are detected and marked as bad data slices to exclude. In step 1104, data with certain missing values, short-term spikes, and frozen values may be further repaired with, for example, interpolations, correlated predictions, and internal model-based prediction, as described in U.S. Pat. No. 9,141,911. A cleansed dataset is created that excludes the identified bad data and/or utilizes the repaired data. The system 1000 (at step 1105), further performs data preprocessing for model identification because the raw (and cleansed) dataset may have a different sampling rate from that which an MPC controller needs, the time-series measurements may be noisy and with bias, or other equivalent reasons. The data pre-processing may include, but is not limited to, data-filtering (i.e. de-noising), data-detrending (e.g. trends removal), data resampling (e.g. down-sampling or up-sampling), etc.

PID Loop and Cascade Loop Search (Second Step 1200)

FIG. 2C is a flow diagram depicting the workflow 1200 in an example embodiment of the present invention for identifying PID control loops from a set of process variables within a plant historical dataset. Initially, a list of process variable tags is received from the loaded raw measurement dataset at step 1201. The process variable tags identify each process variable in the dataset and may be sorted alphanumerically. Then in step 1202, the system 1000 searches and identifies existing PID loops using an automated algorithm based on the process variable tags' name, prefix, and suffix. In some embodiments, the algorithm (step 1202) is agnostic to the prefix and suffix naming convention used to name tags in the loaded raw measurement dataset.

One example embodiment of the algorithm (step 1202) can iterate through the list of tag names, representing different process variables, and automatically determine how to parse the tag names and groups tag names that share the same prefix. These groups of tag names (and their corresponding process variables) that share the same prefix will hereinafter be referred to as prefix groups. The algorithm (step 1202) adjusts how the tag name is divided between the prefix and suffix in order to identify a prefix group that contains a minimum of three tags. In some applications, an entire tag name can be identified as a prefix. But since each tag name is unique, only one tag name in each prefix group can be identified as its own prefix. The tags in prefix groups that do not have three members minimum (i.e. SP, PV, and OP) may be excluded from further consideration and analysis. After the prefixes have been identified the algorithm (step 1202) iterates through the tag groups again and identifies suffixes that are shared across multiple tag name prefix groups and group suffixes that appear together in multiple prefix groups. These groups of suffixes (and their corresponding process variables) that appear together in multiple prefix groups will hereinafter be referred to as suffix groups. The algorithm (step 1202) identifies how many prefix groups each suffix group appears in and stores the most common suffix groups for further consideration.

At step 1203, the system 1000, 1200 classifies PID loop suffixes in each prefix group and then at step 1204 further identifies PID Loop Mode (e.g. Auto, Manual). This classification is performed by looking at each suffix group and identifying how the process variable measurement data for each tag is related to each other and classifying three of the suffixes as the SP, PV, and OP for each prefix group.

As an example, in a typical PID loop the SP and PV have the same magnitude and similar values. This behavior results from the objective of a PID loop, to get the PV to its SP. Additionally, many PID controllers have SP-PV tracking where the SP will be set equal to the PV if the PID loop is in Manual mode. In some embodiments, this relationship can be found by identifying which suffixes in a prefix group have similar measurement values. This can be determined by comparing the relative differences between the suffixes or by identifying if a linear relationship exists with a slope of unity. The suffixes that have this relationship can be identified as being the SP and PV. In some applications, the suffix groups will only contain three suffixes. In these cases, the suffix, that corresponds to the OP can immediately be identified if the suffixes corresponding to the SP and PV have already been identified, even if the algorithm (step 1202) has not determined which suffix corresponds to the SP and which suffix corresponds to the PV. In other applications, the suffix groups will contain more than three suffixes. In these cases, the SP and PV suffixes can be identified in the same way but the behavior of the OP also needs to be considered. These other tags that appear in the suffix list typically refer to statuses, alarm limits, and other variables that have binary values, enumerated integer values, or real values that do not change often. Understanding the behavior of the OP in PID loops allows the algorithm (workflow 1200) to identify the OP among these other tags. In many applications the measurement values of the OP are typically between 0% to 100%. Since binary and enumerated variables typically have a finite set of integer values they typically appear only at the lower range of values such as 0, 1, 2, etc. Some embodiments of this invention could look at how much of the 0% to 100% range the measurements of a suffix cover in order to identify the suffix that corresponds to the OP.

Additionally, in some applications the OP is not restricted to 0% to 100% and can take on values of any finite magnitude. Since the OP is the input being used to get the PV to SP, the OP is often moving regularly to reject disturbances and get the PV to the SP. In other cases, the OP is filtered and moves in discrete steps when a change in the output exceeds some threshold. In these cases, the OP is moving more often than the other variables included in the dataset (e.g. alarm limits that are not regularly changed) excluding those that have been identified as the SP and PV. Some embodiments (i.e., seed model development method and system 1000, second step 1200) of this invention can identify the OP suffix among the rest of the suffixes by counting how often the OP measurement value changes. By taking into account this and other known behavior patterns, the suffix corresponding to the OP can be identified by the system's algorithm.

The two suffixes corresponding to the SP and PV, if they were not explicitly identified as either but were identified as a pair, can be explicitly identified by noting that when a PID loop is in Auto mode, the SP maintains a constant value while the PV, a process measurement nosily changes its value based on actual measurement changes as well as random fluctuations in the signal. Some embodiments 1000, 1200 of this invention can look at which of the two signals has more periods where the signal is at a constant value and can use this information to classify which suffix corresponds to the SP and classifying the other suffix to the PV.

The previous examples are not a comprehensive list of how the SP, PC, and OP may be identified. The invention is capable applying knowledge of the process system, PID loops and their behavior to the process variable measurements in the dataset and their associated tags in a multitude of different ways.

The classification of variables is performed on each prefix group individually. Then through a majority voting mechanism, across all the prefix groups, the suffixes for SP, PV, and OP are identified to be consistent across all of the prefix groups. This assigns the SP, PV, and OP to the same suffixes in each prefix group. Prefix groups that do not contain all three of the labeled suffixes are dropped from consideration and suffixes not identified as being the SP, PV, or OP are also dropped from consideration. The remaining prefix groups with the suffixes corresponding to the SP, PV, and OP are identified as a list of existing PID loops. As a result of step 1203, each existing PID loops and their associated SP, PV, and OP are identified and grouped as inputs to workflow 1250 for further Cascade Control loop search and analysis.

FIG. 2D illustrates a flow diagram depicting the workflow 1250, searching Cascade Control loops in an example seed model development system and method 1000 (FIG. 2A) of the present invention. At step 1251, the system 1000, 1250 loads measurements for the process variable identified as SP, PV, and OP in step 1200 (detailed above in FIG. 2C). Then the system 1250 identifies if the measurements were made under Cascade Control mode and PID loop Auto/Manual mode and creates corresponding slice marks based on the measurement data at step 1252 and step 1253. Cascade Control mode refers to a mode where the SP of a PID loop is being written to by another supervisory controller. The supervisory controller can either be another PID loop where the OP of the supervisory loop corresponds to the SP of the loop in cascade or some other supervisory controller such as an MPC controller. In Cascade Control mode (at step 1252), the SP is being adjusted and the PID loop continues to move the OP to get the PV to the SP. Some embodiments of the invention may identify Cascade Control loops when all the measurements for SP, PV, and OP are moving continuously and the PV is relatively close to the SP in value.

The system 1250 (step 1253) identifies Manual mode by identifying regions where the OP maintains a constant value or makes discrete steps to a new constant value while the SP and PV move continuously. At any given moment in time, the mode of the PID loop can only be in Cascade Control mode or Manual mode as the modes are mutually exclusive. For a given PID loop, the system 1250 stores the range of times that each mode occurs, start times, end times, and identified mode.

The system 1250 also searches for output (OP) saturation status (if any) over time at step 1254 and counts the number of samples at OP saturation status. Output saturation refers to the situation where the output of a PID loop is fully open or fully closed and cannot move any further to get the PV closer to SP. This can be identified by noting periods in time where the PID loop is in Auto or Cascade and the OP hits a maximum or minimum value and remains constant at that maximum or minimum value. Typically, the constant value is at 0% or 100% but it could occur at other values as well. Only the maximum and minimum values that the PID loop controller sends to the OP when in Auto mode or Cascade Control mode are considered for identifying OP saturation. The system 1250/step 1254 stores the range of times that the PID loop is saturated. The time periods for both the modes and OP saturation are used to create slicing marks used in workflow 1400. If the SP of a PID loop is selected as an input to the MPC controller, the process variable data during Auto where the OP is not saturated is identified as good for model identification with the rest of the data sliced out. If the OP of a PID loop is selected as an input to the MPC controller, the process variable data during Manual mode or from when OP is saturated is identified as good for model identification with the rest of the data sliced out. The remaining good data, in both these cases, is further screened in workflow 1400 during step 1403 discussed further below in FIG. 2F.

Continuing with FIG. 2D, after the modes are identified, the system in step 1255 calculates statistics by counting a percentage of samples over time in each identified mode. In step 1256, the normal mode of the PID controller is identified as the mode that the controller is in most of the time, based on the results of the statistics calculated in step 1255.

At step 1257, the system calculates a service factor based on the following equations:

$$SF = (\text{\# of samples at AUTO+CASCADE-SATURATED})/\text{\# of Total samples}$$

If a loop is identified as being in cascade mode, or it is in auto mode but its SP moves a lot, implying it's actually in cascade control but filtered, the system 1250 may attempt to find a linear correlation between the OP of a PID loop in auto and the SP of the PID loop in cascade. If a strong relationship can be identified, some embodiments may use a linear regression and determine if the relationship has a high coefficient of determination (also referred to as R-squared) or low squared mean error. If the correlation is high, the system can identify multiple PID loops in cascade under a single primary controller. Some embodiments of this invention can identify additional PID loops in cascade control that are under the PID loops identified in workflow 1250 with a primary loop above them, organizing the loops into a hierarchy of an outer loop and progressively more inner loops. This is done by finding a strong linear relationship between an OP of a PID loop in cascade control mode and the SP of another different PID loop in cascade. Since the modes of the PID loops are identified individually for each PID loop, it may be necessary to reconcile the modes of PID loops in cascade with the primary PID loops. The system 1250 can identify regions where the primary PID loop is in Auto but the secondary loop is not in cascade as meaning the primary loop is not actually in Auto because it is not controlling the secondary loop, instead the cascade loop is in manual since the SP is in Auto.

In FIG. 2A, second step workflow 1200 may be executed by the seed model development system 1000 either simultaneously with or sequentially from first step workflow 1100. The outputs of workflows 1200 and 1250 of FIGS. 2C and 2D are used in later steps of seed model development method and system 1000 to help configure the initial MPC model inputs and outputs.

Correlation and Nonlinearity Detection and Treatment (Third Step 1300)

Figure 2E:
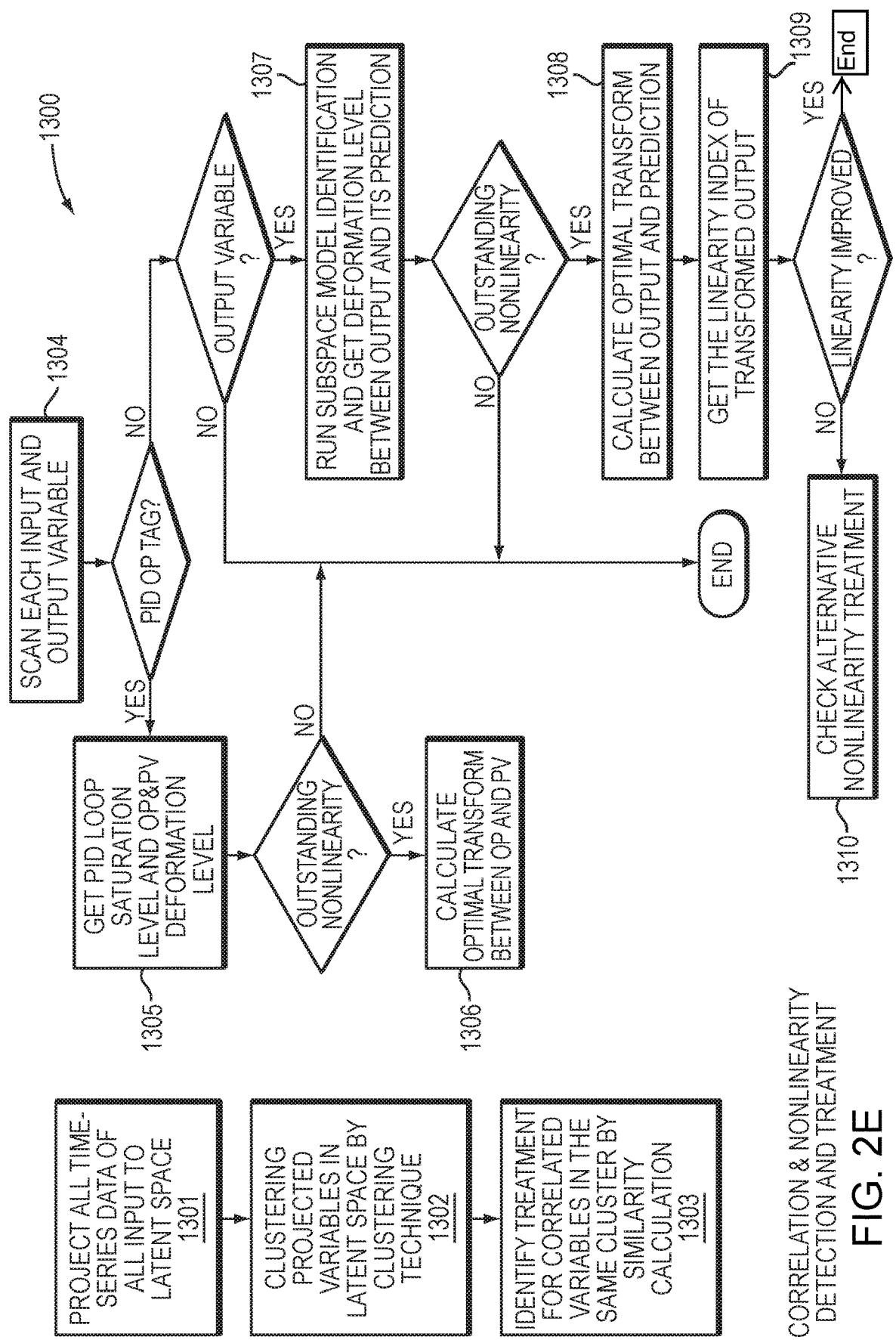
FIG. 2E is a flow diagram illustrating correlation and nonlinearity detection and treatment, according to the example embodiment of FIG. 2A.

FIG. 2E is a flow diagram depicting the workflow 1300 (third step of seed model development method and system 1000) in an example embodiment of the invention. In workflow 1300, the cleansed and pre-processed dataset is retrieved and the system 1000, 1300 detects correlated input variables. Then the system identifies nonlinearity among both input and output variables and applies suitable transforms to linearize the relationship between input and output variables.

In the retrieved dataset, some of input process variable measurements are highly correlated with each other. If unaddressed, these highly correlated input variables will cause significant singularity issues in traditional linear model identification in the later steps of seed model development method and system 1000/MPC application 200 and other related APC applications. When there are multiple sets of correlated process variables in the same dataset and the total data samples in a dataset are massive, it is impossible for an APC engineer to manually find out correlated input variables and identify suitable treatment for each set of correlated variables. Therefore, embodiments are able to perform an automated "correlation detection and treatment" task 1300 with following methods and steps shown in FIG. 2E and discussed next.

In FIG. 2E, the system 1000, 1300 applies a principal component analysis (PCA) technique (step 1301) to reduce the redundant samples (measurements) of input process variables in the dataset. A standard PCA technique is applied to the cleansed and pre-processed dataset from previous steps 1100 and 1200 which will project the long time-series input process variable measurements onto a compressed latent space, resulting in transforming these input variable samples to latent variable samples with highly-reduced order. For example, a typical 5 years of operation history of a plant process may contain 2.6 million samples for 50 input variables. PCA techniques can reduce the amount of the input variable samples to less than 50.

The system 1000, 1300 next applies (at step 1302) a clustering technique to the compressed latent variables derived from step 1301 to get the clusters of input sample variables. By taking advantage of the projected latent sample variables, a clustering technique is utilized to classify similar latent variables into the same cluster. These similar latent sample variables are correlated input variables based on the projection relationship derived in step 1301. In contrast, independent or non-correlated input will have its own cluster stand-alone. The clustering technique could be K-Means clustering method or other similar clustering techniques.

Then the system 1000, 1300 defines a similarity index for all correlated input variables and decides if merging or dropping (at step 1303). A special similarity index is defined based on the following mathematical properties:

$$\text{Similarity Index} = \left(\frac{\text{MAX}i - \text{MAX}j}{\text{MAX}i + \text{MAX}j}\right)^2 + \left(\frac{\text{MIN}i - \text{MIN}j}{\text{MIN}i + \text{MIN}j}\right)^2 + \left(\frac{MOVEi - MOVEj}{MOVEi + MOVEj}\right)^2$$

where MAXi is the maximum value of i-th input variable in the dataset; MINi is the minimum value of i-th input variable in the dataset; and MOVEi is the standard moves of i-th input variable. The system 1300 merges any correlated input pair when their Similarity Index based on equation is smaller than a threshold value, εs. Default parameter value εs is given by the system, e.g., εs=0.0001 but may be adjusted based on the needs of the system and user.

For some APC models, for example those deployed in refineries and petrochemical plants, the nonlinearity among input versus output or input/output itself are usually resolved by applying a monotonical transform to the original variable. With the help of transform applications, nonlinear variables can be linearized and used in the linear models to significantly improve control performance. The challenge is automatically identifying if one variable has nonlinearity without APC engineers' manual trial and error which can be both inefficient and misleading.

Therefore, some embodiments 1000, 1300 further perform "nonlinearity detection and treatment" as outlined in steps 1304 to 1310. This treatment starts by scanning each input and output process variables (at step 1304). If the scanned variable at step 1304 is a OP tag in any PID loop the following steps are taken:

(1) The system 1300 calculates the PID loop's Saturation Percentage and the deformation level between the OP and PV tags and their associated process variables (at step 1305). The saturation percentage of the targeting PID loop is identified at step 1255 and Define Piece-Wise Linearity Index (PWLI) is used to describe the deformation level and is calculated using the following equation:

$$\text{PWLI} = \sum_{k=1}^{m} w_k * R_k^2$$

Where the OP variable vector data is divided into m period; the k-th (k=1, . . . , m) period contains all data samples with value in the range of $$\left[\frac{k}{m}(\text{MAX} - \text{MIN}) + \text{MIN}, \frac{k+1}{m}(\text{MAX} - \text{MIN}) + \text{MIN}\right]$$

for the OP variable; $w_k$ is the data amount percentage of k-th period with respect to the whole data vector of the OP variable; $R_k^2$ is the standard determination coefficient of the k-th period:

$$R_k^2 = \frac{\sum_{i=1}^{n_k}(OPi - \overline{OP})(PVi - \overline{PV})}{\sqrt{\sum_{i=1}^{n_k}(OPi - \overline{OP})^2}\sqrt{\sum_{i=1}^{n_k}(PVi - \overline{PV})^2}}$$

with OPi as the value of the i-th sample of the OP tag in the k-th period (k=1, . . . , m) with $n_k$ total samples and $\overline{OP}$ as the mean value of all samples of the OP tag in the k-th period. PVi and $\overline{PV}$ are the corresponding values with the same time stamps as of OP samples in the k-th period.

(2) If the calculated PWLI and Saturation Percentage at step 1305 satisfies the following conditions, i.e., there is a strong nonlinearity relationship between OP and PV tags in the PID loop, the system 1300 calculates and implements an optimal transform between OP and PV tags at step 1306:

PWLI<$\varepsilon_P$ & Saturation Percentage>$\varepsilon_V$ where $\varepsilon_P$ and $\varepsilon_V$ are the threshold values given by the system, e.g., $\varepsilon_P$=0.3 and $\varepsilon_V$=0.05. The threshold values may be set at any level depending on the needs of the system and user.

If the PWLI and Saturation Percentage do not show a strong nonlinear relationship, no additional action needs to be taken.

If the scanned variable at step 1304 is not a OP tag in any PID loop but an output variable as selected by the APC engineer, the system 1300 can implement the following alternative steps:

(3) The system 1300 applies the subspace identification techniques developed by the assignee (See U.S. Pat. No. 9,727,035 for details, which is incorporated herein by reference in its entirety) to the output variable to get its corresponding prediction value at step 1307. One or more deformation levels may be defined as the discrepancy between the values of the original output variable vector and its corresponding prediction vector, for example, the following Piece-Wise Nonlinearity Index (PWNI) is used in the embodiments:

$$PWNI = \Sigma_{k=1}^{m} w_k * Res_k^2$$

Where the output variable vector is divided into m periods; the k-th period (k=1, ..., m) contains all data samples with value in the range of $$\left[\frac{k}{m}(MAX - MIN) + MIN, \frac{k+1}{m}(MAX - MIN) + MIN\right]$$

for the output variable; $w_k$ is the data amount percentage of k-th period with respect to the whole vector of the output variable; $Res_k^2$ is a specific residual coefficient between original output vector and its corresponding prediction from subspace model identification for the k-th period, with following mathematic equation:

$$Res_k^2 = \sqrt{\frac{2 \sum_{i=1}^{n_k} (ORIGi - PREDi)^2}{\sum_{i=1}^{n_k} (ORIGi + PREDi)^2}}$$

with ORIGi as the original value of the i-th sample of the output variable vector in the k-th period with $n_k$ total samples and PREDi as the corresponding prediction value with the same time stamps as of output variable samples in the k-th period.

(4) If the calculated PWNI at step 1307 exceeds a threshold, $\varepsilon_N$, the system 1300 implements an optimal transform calculation based on the original output variable vector and its prediction vector at step 1308. $\varepsilon_N$ is given by the system by default, e.g., $\varepsilon_N$=0.25 and may be adjusted based on the needs of the system or user. A high PWNI value indicates the there is a strong nonlinearity relationship for the current output variable with respect to its input variables used in subspace model identification.

In step 1309, the system 1300 utilizes subspace model identification and the transformed output variable to get the corresponding transformed prediction vector. Then the system 1300 calculates the PWNI of the transformed output variable and compares it with the original output variable's PWNI. If the comparison demonstrates that the linearity index improves both absolutely and relatively, then the system 1300 keeps the applied transform from step 1310.

If, after step 1309, the linearity index is not improved or not improved enough, in step 1310, the system 1300 can explore alternative nonlinearity treatments.

Data Selection with AI Pattern Search (Fourth Step 1400)

Figure 2F:
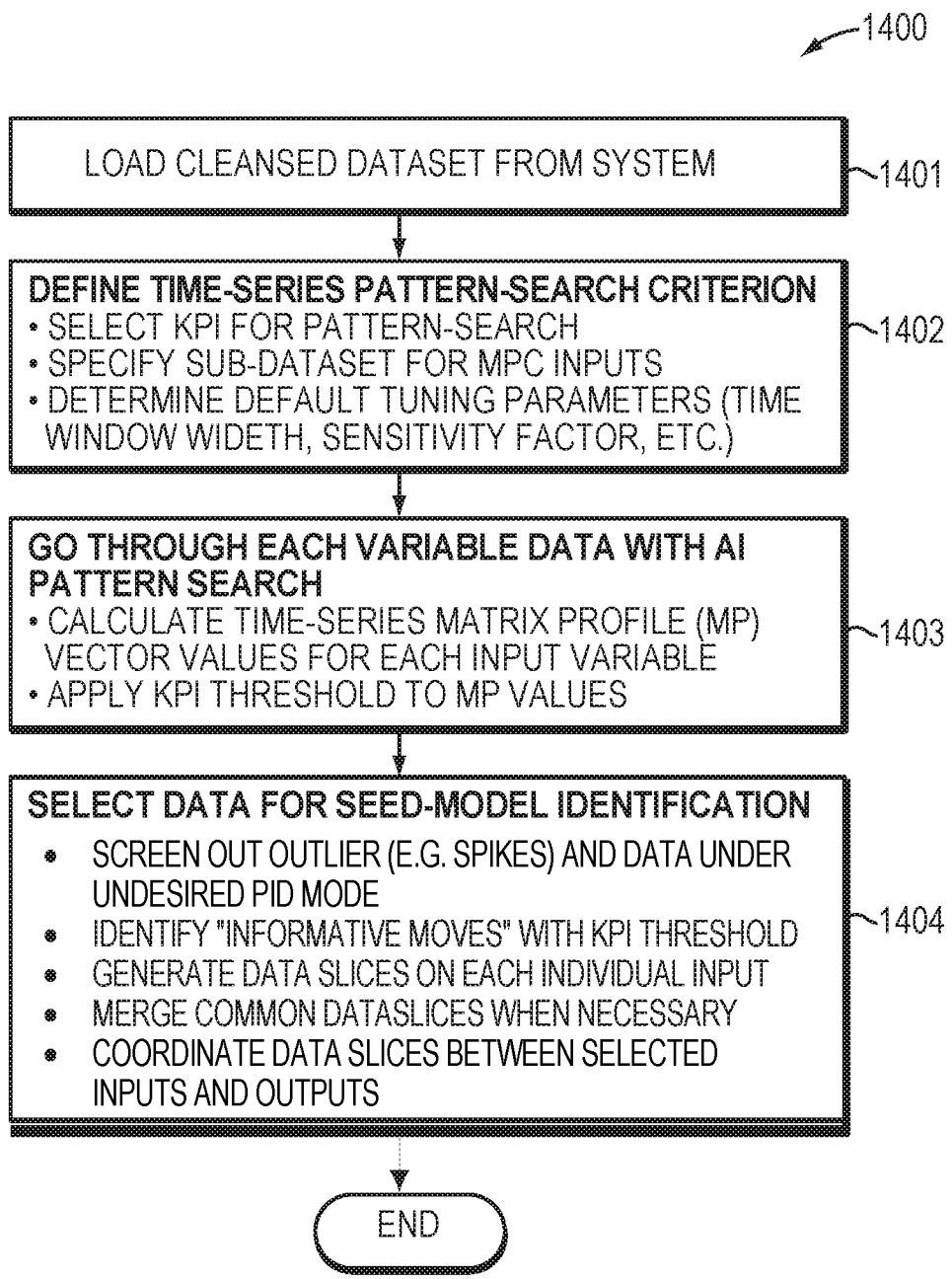
FIG. 2F is a flow diagram illustrating data slicing and data selection using AI pattern search techniques, according to the example embodiment of FIG. 2A.

FIG. 2F is a flow diagram depicting the workflow 1400 in an example embodiment of the fourth step in seed model development method and system 1000 of FIG. 2A. The cleansed, pre-processed, and transformed dataset prepared by workflows 1100, 1200, and 1300 is first retrieved at step 1401. The received data in step 1401 may have been treated with any combination of the workflows (methods and systems) 1100, 1200, 1250, 1300 discussed above in FIGS. 2A-2E, and other data processing methods. Then, in steps 1402, 1403, and 1404 of FIG. 2F, the system 1000, 1400 searches for and identifies "informative data segments" automatically with the unique innovative techniques described in this disclosure.

In the retrieved dataset, each time-series of process variable measurements/values (engineering tag) has the following characteristics: (1) long time-series of data containing relatively less information useful for model identification. For example, a typical 5 years of operation historian may contain 2.6 million data samples for each engineering tag, and the total data samples in a dataset are massive—it is impossible for APC engineer to screen all the data and manually select useful data slices; (2) among those data samples, there may be only a few small segments showing sensible moves (i.e. "informative moves") due to an operator's adjustments of a PID control set-point value or process feed changes in the plant operation history; (3) those "moves" appear randomly in time, magnitude (not regular or repeatable) and shape, therefore, a standard time-series pattern-search approach (e.g. Thanawin Rakthanmanon et al., "Searching and Mining Trillions of Time Series Subsequences under Dynamic Time Warping", SIGKDD 2012, Aug. 12-16, 2012, Beijing, China) is not suitable for identifying them. The embodiments 1000, 1400, instead, perform a specific "data search and mining" task with the following methods and steps:

(1) Define time-series pattern-search criterion (step 1402): A special key performance indicator (KPI) is defined based on the following mathematical properties:

(a) KPI=f(t, $x_1(t)$, $x_2(t)$, ..., $x_n(t)$,) where KPI is a function of time t, depending on the values of one or more process variables at time t or variations over a time-window;

(b) 0<=KPI<infinity, i.e. the KPI is bounded;

(c) KPI has good Selectivity and Sensitivity on "features" to find and extract from the base time-series data.

(2) Specify a sub-dataset of a group of candidate inputs of MPC (step 1402): In the dataset there are many process variables that are natively independent, while others are dependent, which may vary following (respond to) one or more incident variable's changes in values (moves). The most useful data segments for model identification are those subsets of time series over a period during which significant moves in one or more independent variables appeared and corresponding changes (response) in dependent variables are also observed. Therefore, subsets of independent and dependent process variables are selected as inputs and outputs respectively by user (typically APC engineer) for a target MPC configuration.

(3) Determine tuning parameters for the specific data search and mining (step 1402):

One or more special KPI(s) may be defined as far as they have the properties (a) to (c) described in (1), for example, the following two of such KPIs are used in some embodiments:

$$KPI_{complex} = \frac{1}{n}\sum_1^n x^2(t)$$

$$KPI_{moves} = \frac{\sqrt{\int_1^n \Delta x^2}}{n^p}$$

Where Δx=x(t)−x(t−1), n is the length of a moving window, 0≤p≤5;

Default parameter values of n and p are given by the system 1000, and they are adjustable by user. After the dataset is treated by the system using workflows 1100 and 1200, outlier data (e.g. spikes, signal failures), or data under undesired PID mode are screened out and not accounted in the following informative data search and slicing.

Embodiments (at steps 1403 and 1404) perform informative data search and slicing with following steps:

(1) Calculate KPI vectors based on the above equations. One associated KPI vector is calculated for each selected independent process variable by sliding a time window over all samples of that independent process variable;

(2) Re-scale each KPI vector with its own maximum and minimum values to result in a group of scaled KPI time series of values zero to one (0-1);

(3) Screen each associated KPI vector of values (time-series) with a scaled threshold θ (e.g. θ=0.5) and mark data segments having values above the threshold as good data slices.

(4) Optionally, embodiments 1400 allow a user to view the data slicing results and adjust the values of tuning parameters n, p, and threshold θ, and re-run the data search and slicing;

(5) Repeat steps (1)-(4) for each independent process variable until all candidate MPC input variables are searched and at least one input variable is confirmed with one or more good data slices found.

Figure 3A:
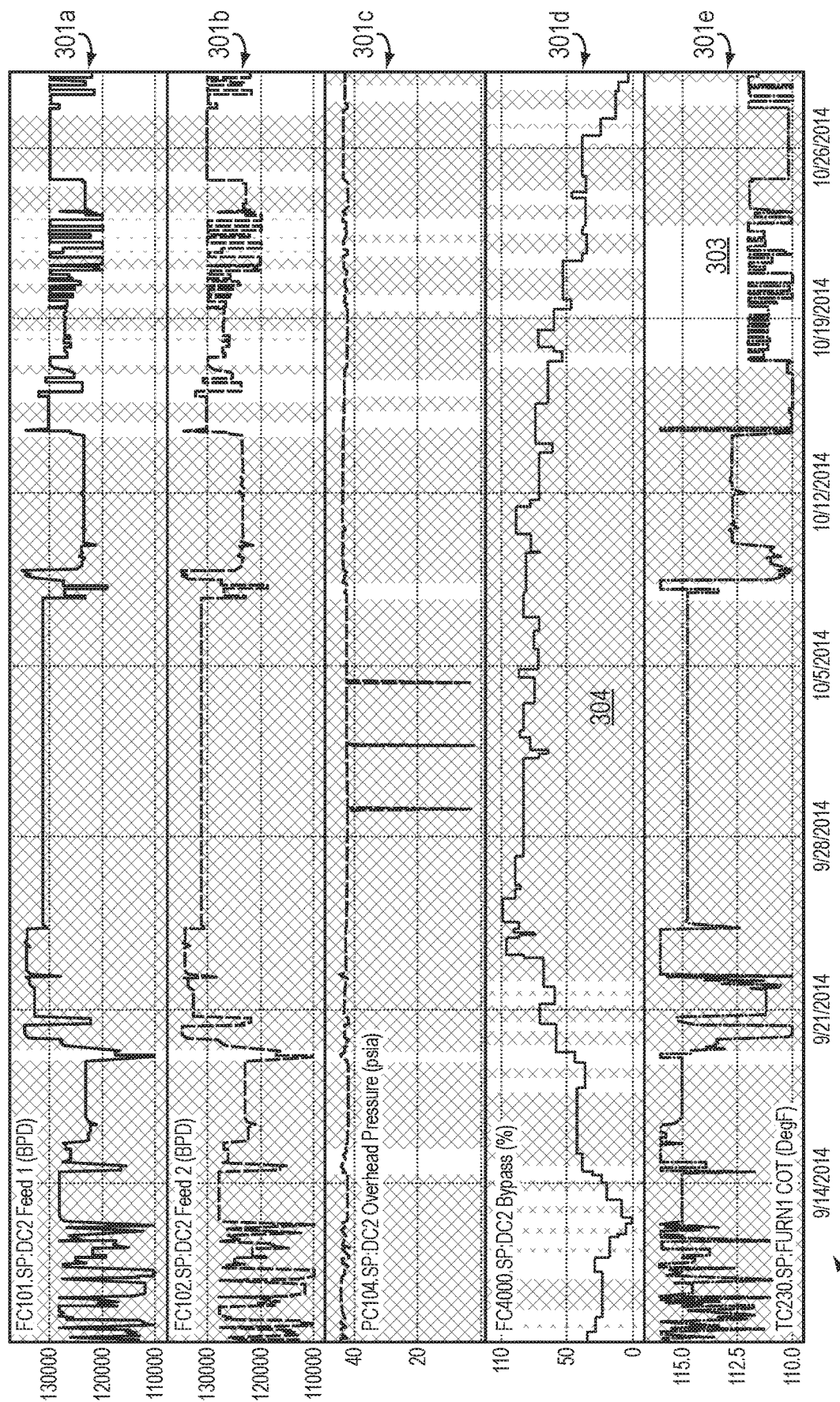
FIGS. 3A, 3B and 3C demonstrate an example user interface, in embodiments, used to build a seed-model from historical plant data.

FIG. 3A illustrates an example of the results of data searching and slicing from a refinery historical dataset. FIG. 3A shows a screenshot of a user interface 300 for use with embodiments of the disclosed invention. FIG. 3A displays line graphs 301a-e in interface element 307 of the values for 5 process variable time-series in a dataset derived from over 6 months of historical data of a subject process 110 in a refinery plant. Interface 300 allows a user to select which process variables to view, for example in selection window 302. The bright areas (e.g. section 303) for each process variable are the data segments containing informative "moves" and marked as good data slices, while all dark areas (e.g. 304) are data segments that do not contain informative "moves" and are excluded from model building (e.g., step 1500 of method and system 1000). The good data was identified using workflow 1400 and the equations described above in FIGS. 2A-2F. Notably, that within each good slice (bright area 303), one or more clear "moves" are visible in the variations of each process variables' graph 301a. Due to the re-scaling of each process variables' KPI, informative "moves" are identified in relation to the general variation of the process variable. For example, it takes less variation to identify an informative "move" in "steady" graph 301c than in "volatile" graph 301a. Those data slices identified by workflow 1400 are further consolidated for building an APC seed-model in workflow 1500.

Steps (3) and (4) of data selection workflow (steps 1403 and 1404) above provide a "relative standard" to select informative data. The standard for the most informative data is relative, because it is compared to the rest of the data in that variable. As an alternative, steps (3) and (4) can be changed to the following to provide an "absolute standard" to select informative moves:

(3*) Screen each associated KPI vector of values (time-series), count the length of constant KPIs if they pass the minimum threshold. The length indicates how "clean and sharp" the move is. The minimum threshold ensures the move has a significant enough magnitude.

(4*) Optionally, the embodiments allow user to view the data slicing results and adjust the values of tuning parameters n, p, and the level (e.g. "High", "Medium", "Low") of good data, and re-run the data search and slicing.

If necessarily, different tuning parameters n, p, threshold θ, or level of good data can be applied to each input variable.

The good data slices are coordinated between the selected inputs and outputs for the purpose of better model identification in workflow 1500.

Build and Deploy Seed-Model (Fifth Step 1500)

Figure 2G:
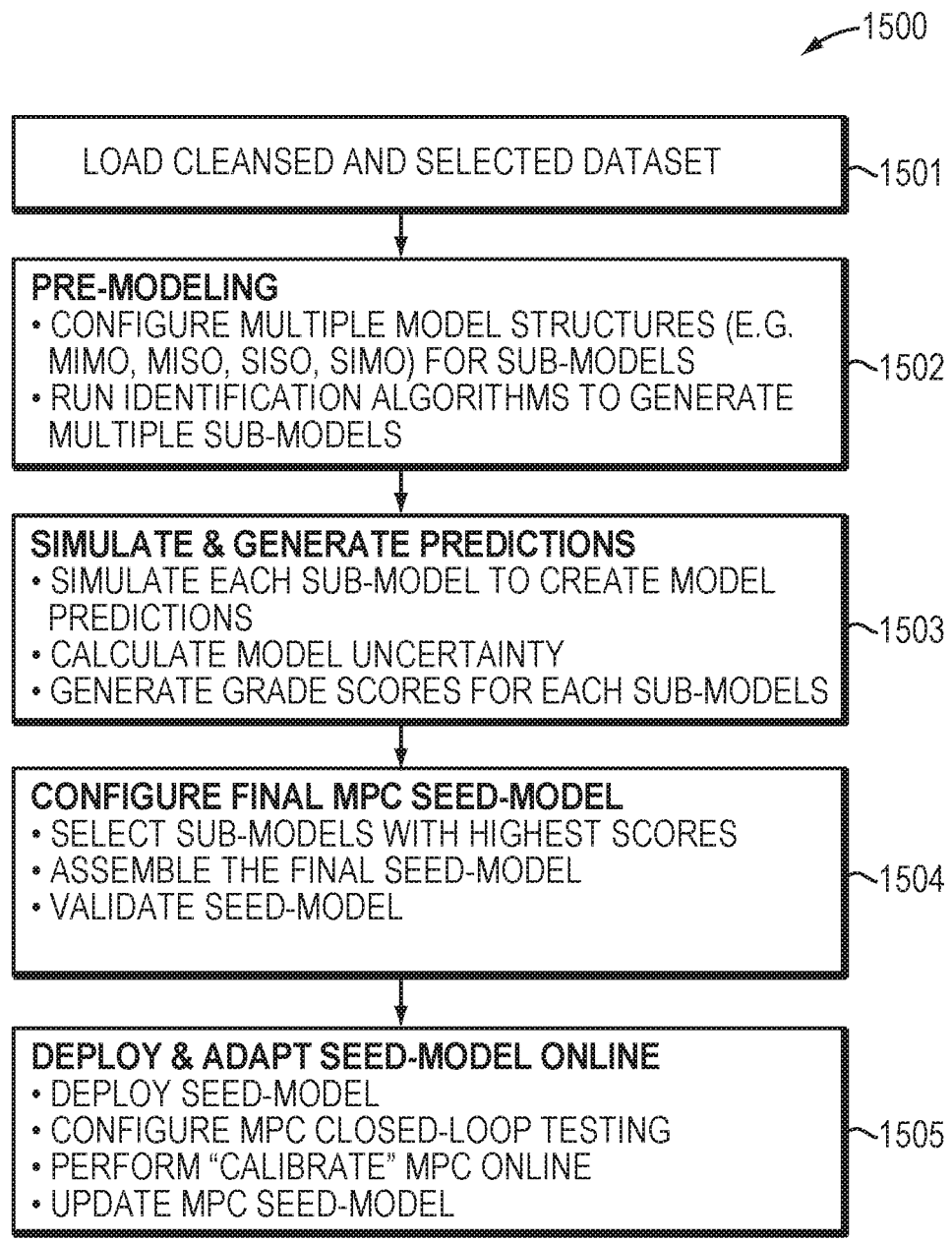
FIG. 2G is a flow diagram illustrating building and deploying a seed-model, according to the example embodiment of FIG. 2A.

FIG. 2G is a flow diagram depicting the workflow 1500 in an example embodiment 1000 of the invention. The system (at step 1501) loads the cleansed dataset with identified good data slices from workflow 1400. Embodiments allow the user to further configure an empty MPC seed-model by specifying a set of independent variables as inputs and a set of dependent variables as outputs, according to the available dataset containing good data slices.

In order to obtain an optimal seed-model from the limited good data slices available, the system (at step 1502) may configure multiple model structures (e.g. Single-Input and Multiple-Output, or SIMO, Single-Input and Single-Output, or SISO, Multi-Input and Single-Output, or MISO and Multi-Input and Multi-Output, or MIMO) for one or more sub-models. Then corresponding multiple model identifications can be run with the proprietary subspace identification techniques developed by the assignee (See U.S. Pat. No. 9,727,035 for details, which is incorporated herein by reference in its entirety).

The embodiments (at step 1503 and step 1504) further simulate and compare the multiple sub-models identified with multiple configuration structures, constructed from selected good data slices. This may include obtaining the finite impulse response (FIR) for each input-output pair for the different models and configurations which are then evaluated against their predictions and calculated uncertainties. More specifically, in some embodiments 1500, a quantitative model quality (MQ) and model grade scores (e.g. A, B, C, D) developed by the assignee (see U.S. Pat. No. 8,560,092 for details, which is incorporated herein by reference in its entirety) are used for sub-model comparison. At the end of step 1504, the empty seed-model is filled with the best created sub-models and a completed and validated seed-model is ready for deployment.

The system, (at step 1505) deploys the seed-model to multivariate control modeling and control system 101 and in some embodiments, configures the initial MPC controller 105 (which may be small in size, depending on the number of sub-models filled) with a closed-loop tester. Multivariate control modeling and control system 101 can utilize the seed model and/or any models derived or evolved from it to control subject process 110.

Online Adaption of Seed-Model (Sixth Step 1600)

Figure 2H:
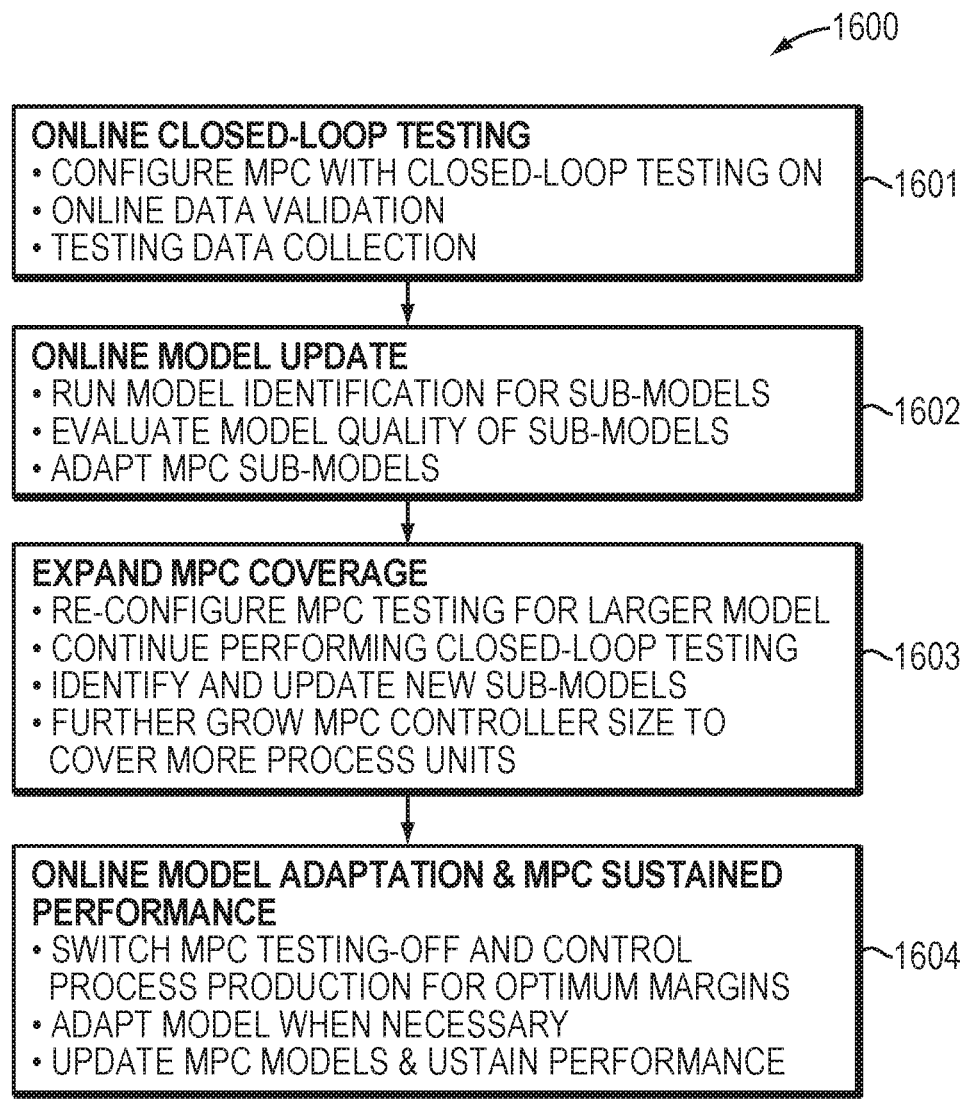
FIG. 2H is a flow diagram illustrating seed-model online adaptation, according to the example embodiment of FIG. 2A.

FIG. 2H is a flow diagram depicting the workflow 1600 for online model adaptation (e.g., step 205 in FIG. 1D) in an example MPC application embodiment 200 of the present invention. System 1600 (at step 1601) configures the MPC controller 105 for closed loop testing as disclosed in applicants related applications and patents, e.g. U.S. Pat. No. 9,513,610. In such closed-loop testing, online perturbation under MPC control, together with data validation and data collection is performed. Next, the system 1600 (at step 1602) runs model identification for the sub-models generated during seed model building workflow 1500 (FIG. 2G), and the sub-models are evaluated. Based on the identification and evaluation, new sub-models may be identified and added, and step 1602 adapts the existing sub-models, to better represent the subject process system 110.

In step 1603, the testing and updating done during steps 1601 and 1602 is expanded and configured for larger models. The larger models include not just a single subject process but a growing interconnected set of subject processes 110 within an industrial plant. Step 1603 permits the MPC controller 105 (or a group of controllers) to model, predict and control more process units 108. Finally, the system (at step 1604), after the initial model adaptation in the previous steps, MPC testing is switched off and the subject process 110 is controlled to remain within optimum margins. Workflow 1600 allows for the models utilized by the MPC controller 105 to control subject processes 110 to continue to be adapted when needed and updated to sustain optimal plant performance.

Example Applications

Figure 3B:
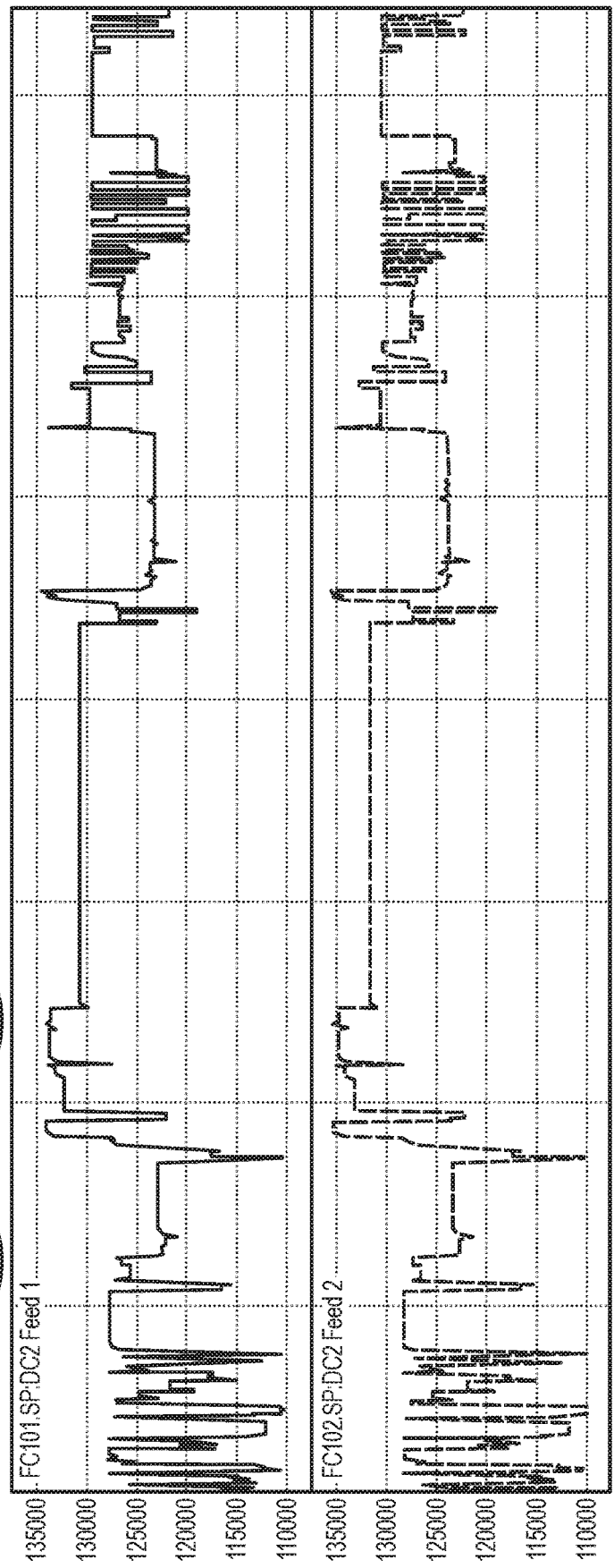
Figure 3B:
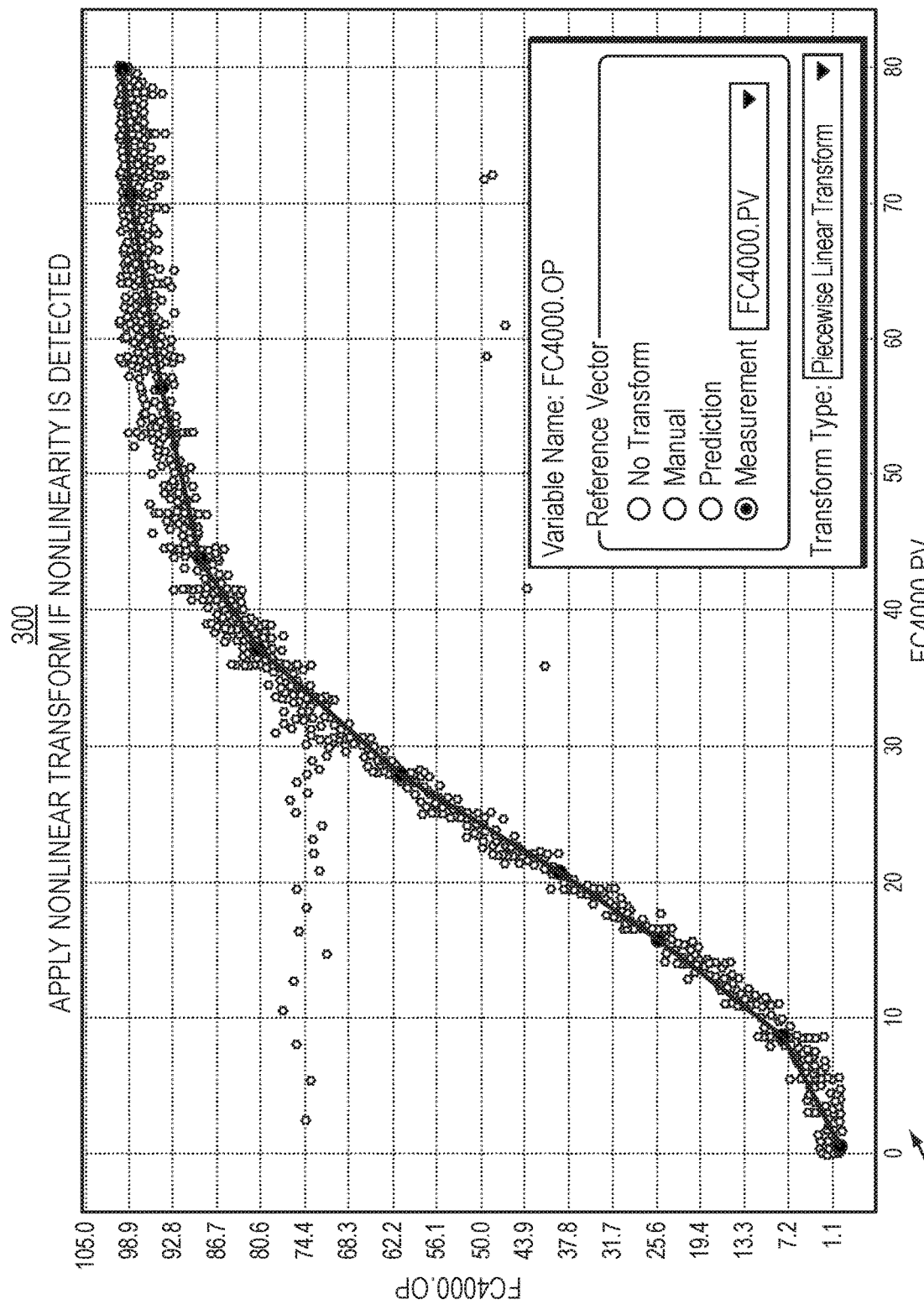
Figure 3C:
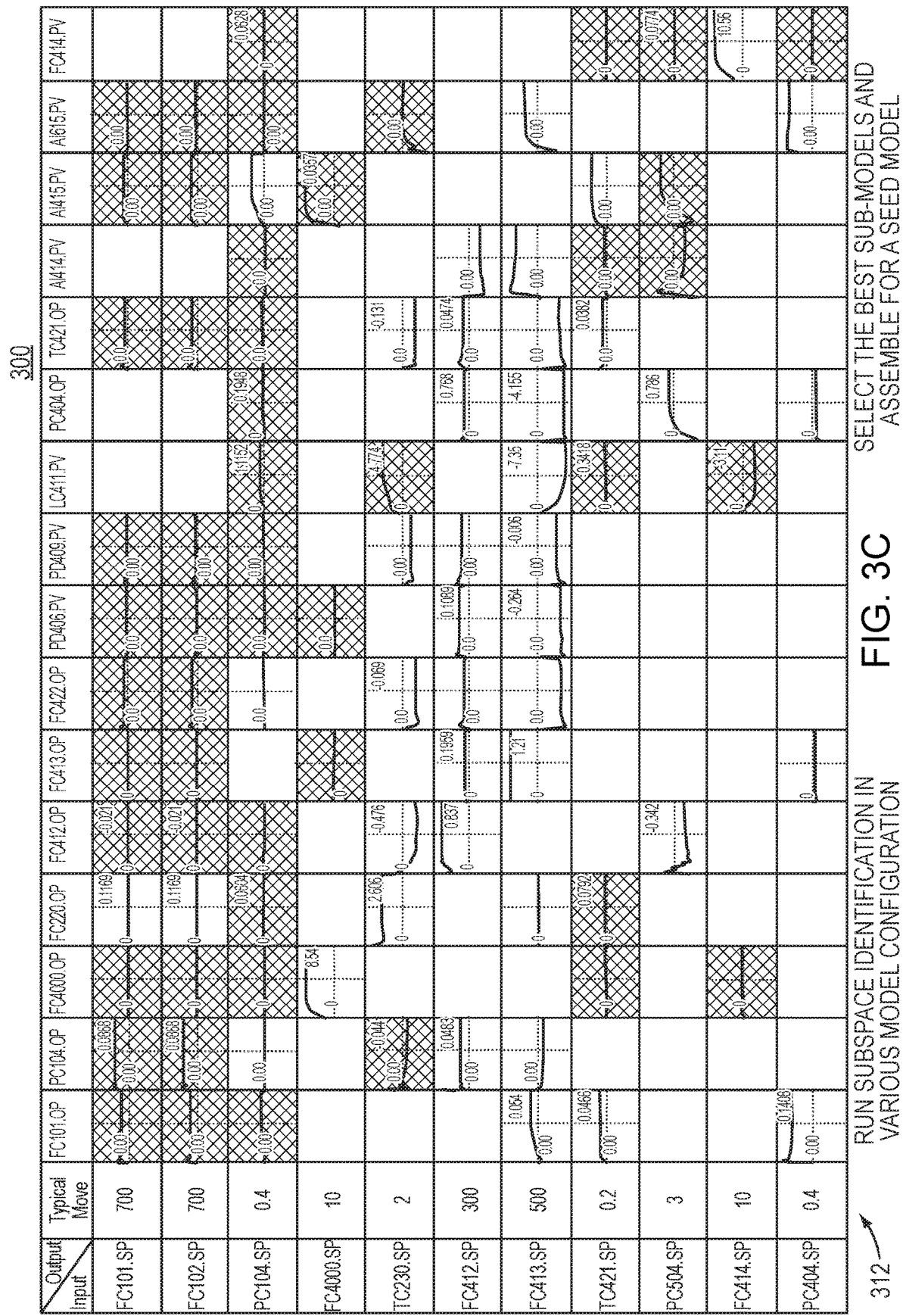

FIGS. 3A, 3B and 3C demonstrate an example user interface used to build a seed-model from historical plant data in embodiments of the present invention. The seed-model can then be used for self-learning advanced process control. The example dataset is generated from a deethanizer ($DC_2$) and depropanizer ($DC_3$) process. First, a dataset is loaded that contains process variables, each process variable having an engineering tag and measurements related to at least one component of the a deethanizer ($DC_2$) and depropanizer ($DC_3$) process. After the loading is completed, cleansing is performed on the process variable in the dataset, which includes detecting and marking bad data slices, and using interpolations or model predictions to repair some bad data slices and other methods to improve model generation and performance. These tasks (methods) and steps are accomplished using computer-implemented workflows 1100, 1200, 1300, and 1400 described above. Some example elements of user interface 300 that depict certain stages and results of those workflows are described below and shown in FIGS. 3A, 3B and 3C.

Window 306 is an example user interface element showing the results of screening process variable engineering tags and identifying PID loops and Cascade control loops based on associations of process measurements and calculated statistics (as described in workflows 1200 and 1250 of FIGS. 2C and 2D).

Window 305 is an example user interface element showing how the user selects process variables for the MPC controller 105. The user may directly select from the list, or type in the "searching box" to narrow down the scope. Window 305 may present the user with relevant process variable properties including tag name, units, description, etc.

Window 302 is an example user interface element that presents the selection of independent variables as inputs (MVs) and dependent variables as outputs (CVs) to build a seed model and ultimately configure an MPC controller 105.

Window 307 is an example user interface element representing the results of mining (as described in workflow 1400 of FIG. 2F) each historical time-series data and identifying informative "moves" for each independent variable. Outlier data (e.g. spikes, signal failures), or data under undesired PID mode, or data of little informative value, are screened out. Valuable data slices for model identification are generated for each independent variable and selected dependent variable.

FIG. 3B shows additional elements of user interface 300. Element 308 is an example user interface element presenting two groups of highly correlated inputs that were identified by performing cross-correlation analysis (as described as part of workflow 1300) on all the candidate inputs. PC504.SP and FC412.SP are highly correlated and FC101.SP and FC102.SP are highly correlated. Graphs 309 are example user interface elements that shows the correlation between the FC101.SP and FC102.SP process variables. Element 310 is an example user interface element that lists process variables with no correlation or abandoned variables.

Graph 311 is an example user interface element for applying nonlinear transform to inputs/outputs (as described as part of workflow 1300). First, the nonlinearity of each output and input is checked. If nonlinearity is detected, an automatic nonlinear transform is applied. As shown in the window, the user may also manually select the reference vector and the transform type. In this example, to transform output FC4000.OP, the user selects the measurement of FC4000.PV as the reference vector and selects Piecewise Linear Transform as the transform type.

FIG. 3C shows an example user interface screen 312 of user interface 300 showing the assembly of selected sub-models to form a seed-model (as described in workflow 1500). First, the system 1500 runs subspace identification in various model configuration, such as SIMO SISO, MISO, MIMO to obtain sub-models. Screen 312 is an example user interface element that shows generated sub models. Second, the system 1500 selects the best sub-models based on an iterative model identification and optimal model selection. The selected best sub-models are shown in the highlighted squares of screen 312. The selected sub-models are used to generate the seed-model.

Once the seed-model is generated, the system 1600 configures an MPC controller 105 with non-invasive online testing functions used to adapt and improve the seed-model (as described in workflow 1600). Finally, the system 1600 deploys the adapted seed-model to system 101 and MPC controller 105 to activate plant testing while controlling the plant process 110. The system 1600 keeps collecting online testing data (e.g. measurements 130 and test data 132) and repeats model identification to update the seed-model until it converges to a stable MPC model.

Network Environment for Building and Deploying Process Models

Figure 4A:
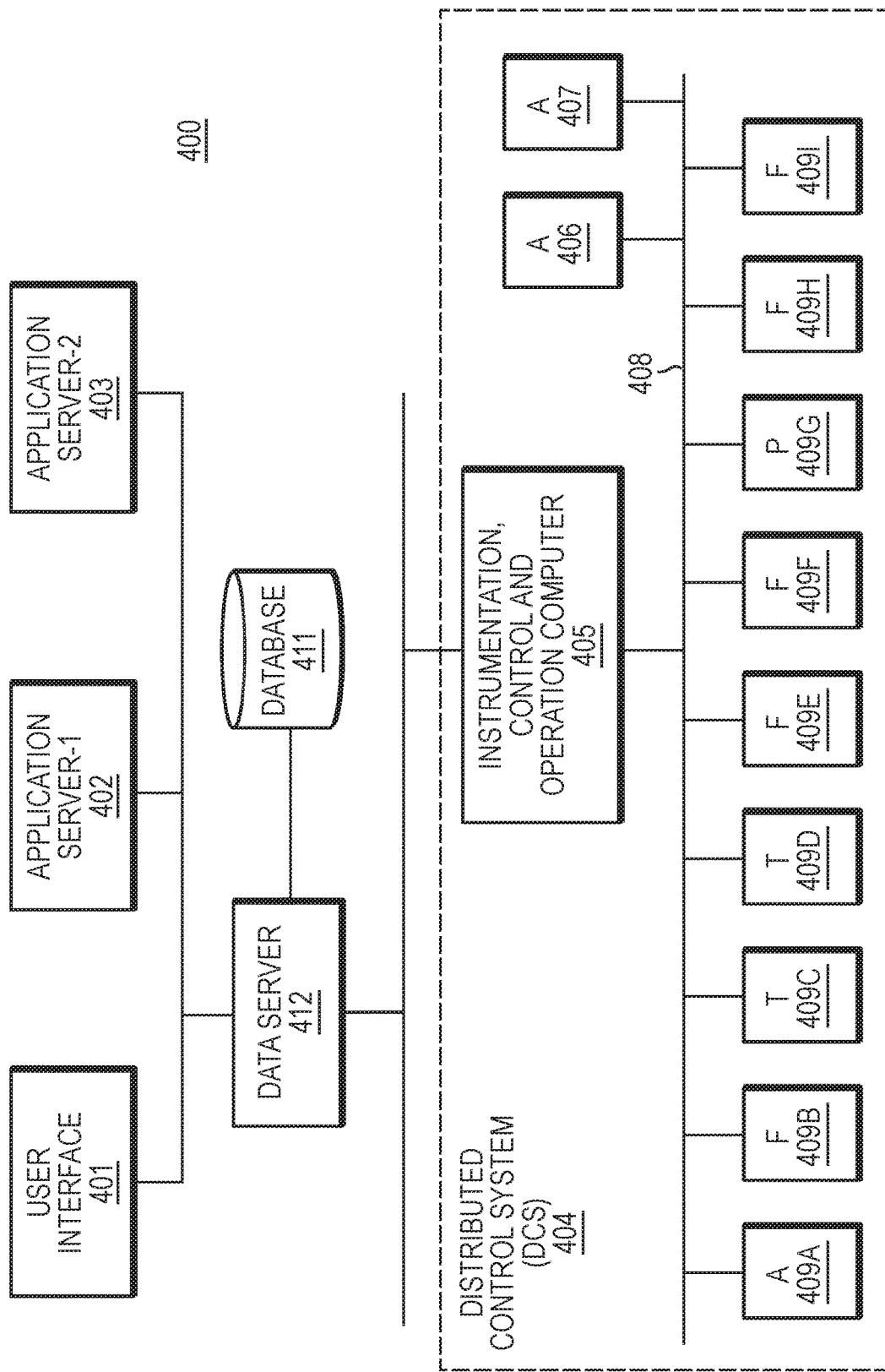
FIG. 4A is a block diagram illustrating an example computer network environment for building and deploying a seed-model for a MPC application, according to an example embodiment.
Figure 4B:
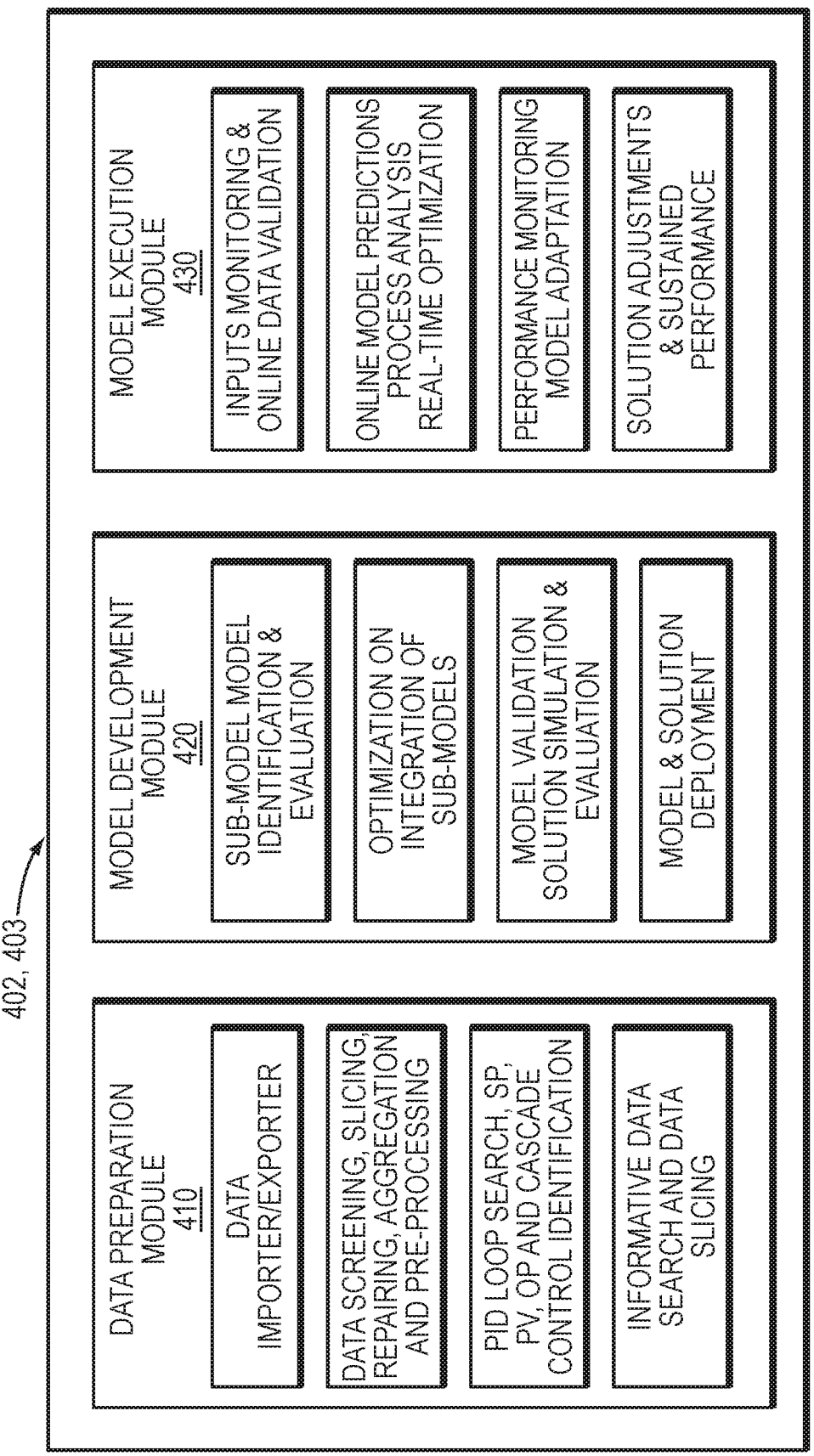
FIG. 4B is a block diagram illustrating example functional modules that can be used by the system of FIG. 4A to build and deploy a seed-model in an industrial process.

FIG. 4A is a block diagram illustrating an example network environment 400 for building and deploying APC seed-model in embodiments of the present invention. The system 400 may be configured as part of the computer network that supports the process operations of a refinery, or a chemical or petrochemical plant, which includes a number of measurable process variables, such as temperature, pressure, and flow rate variables. The System 400 may be configured as part of multivariate control modeling and control system 101. In some embodiments, the network environment 400 executes the workflows 1000, 1100, 1200, 1250, 1300, 1400, 1500, and 1600 of FIGS. 2A-2H to build and deploy APC seed-models to initiate a MPC application 200. FIG. 4B illustrates various functional computer modules that can be used by the network environment in FIG. 4A to build and deploy APC seed models and execute MPC applications.

The system 400 of FIG. 4A includes a first application server (Application Server-1) 402 and a second application server (Application Server-2) 403, which may operate as a model builder and MPC controller. Application servers 402, 403 may also serve as data modules 115 and MPC controllers 105 of system 101 show in FIG. 1B. User interface 401 may also serve as user interface 140 of system 101 shown in FIG. 1B. In some embodiments, each of the application servers 402, 403 may operate alone respectively in real-time as the model builder and MPC controller of the present invention, or the application servers 402, 403 may operate together as distributed processors contributing to real-time model builder and MPC controller. In other embodiments, additional system computers (application servers) may also operate as distributed processors contributing to the real-time operation as a model builder and MPC controller.

The application servers 402, 403 may communicate with the data server 412 to access collected data for measurable process variables from a historian database 411. The data server 412 may be further communicatively coupled to a distributed control system (DCS) 404, 108 or any other plant or refinery control system, which may be configured with instruments 409A-409I, that collect data at a regular sampling period (e.g., one sample per minute), and with instruments 406, 407 that collect data at an intermittent sampling such as online analyzers (e.g., 20-30 minutes per sample) for the measurable process variables of the subject process 110. The instruments 406, 407, and 409A-409I may communicate the collected data to an instrumentation computer 405, also configured in the DCS 404, and the instrumentation computer 405 may in turn communicate the collected data to the data server 412 over communications network 408. The data server 412 may then archive the collected data in the historian database 411 for seed model building and MPC implementation purposes. The data collected varies according to the type of subject (or target) plant process.

The collected data may include measurements and historical values for various measurable process variables. These measurements may include a feed stream flow rate as measured by a flow meter 409B, a feed stream temperature as measured by a temperature sensor 409C, component feed concentrations as determined by an analyzer 409A, and reflux stream temperature in a pipe as measured by a temperature sensor 409D. The collected data may also include measurements for process output stream variables, such as the concentration of produced materials, as measured by analyzers/instruments 406 and 407. The collected data may further include measurements for manipulated input variables, such as reflux flow rate as set by valve 409F and determined by flow meter 409H, a re-boiler steam flow rate as set by valve 409E and measured by flow meter 409I, and pressure in a column as controlled by a valve 409G. The collected data reflect the operating conditions of the representative plant during a particular sampling period. The collected data is archived in the historian database 411 for process modeling and MPC control purposes. The data collected varies according to the type of target process.

Application Server-1 402 may be configured to include an input data preparation module 410 of FIG. 4B to execute steps 1100, 1200, 1250, and 1300 of workflow 1000. Application Server-1 402 is communicatively coupled to a user interface 401. Application Server-2 403 may also be communicatively coupled to a user interface 401. From the user interface 401, a user (e.g., plant engineer, plant operator, or other plant personnel) may initiate building of an APC seed model. To do so, the user, via the user interface 401, may select input and output variables for building the APC seed model.

In response, the user interface 401 may communicate with the data importer/exporter of the input data preparation module 410 (configured on Application Server-1 402), which loads the historical plant measurements for the selected candidate variables, via the data server 412, from a database 411 (e.g., plant historian or asset database). The historical measurements may include data currently or previously collected from sensors, including 406 and 407, by the Instrumentation, Control, and Operation Computer 405 of the DCS 404. The data importer/exporter generates a dataset from the loaded historical measurements of the selected process variable candidates (which may be stored by the data importer/exporter in database 411).

From the user interface 401, the user may then initiate and complete steps 1100-1600 of workflow 1000 as shown in FIGS. 2A-2H. That is, the steps may screen and cleanse certain preselected process variables, from which measurements may be used to build the APC seed models. For example, the user, via user interface 401, may request data cleansing to be performed on the generated dataset (or a plant system of network environment 400 may automatically request the performance of data cleansing). In response, the user interface 401 may communicate with the input data preparation module 410 (of Application Server-1 402) to perform functions on the dataset that may include data screening, slicing, repairing, and pre-processing to reduce the dataset (e.g., remove bad quality data segments and measurements for uninformative process variables). In some embodiments, the input data preparation module 410 may execute step 1400 of workflow 1000 to perform "informative moves" search and data selection on the dataset as described above in FIG. 2F.

The user, via user interface 401, may also request seed model simulation and validation be performed on the generated dataset (or a plant system of network environment 400 may automatically request the model simulation and validation). In response, the user interface 401 may communicate with the input data preparation module 410 (of Application Server-1 402) and other development/execution modules 420, 430 (of Application Server-2 403) to perform functions using steps 1400-1600 detailed above with respect to workflow 1000. In FIG. 4A, Application Server-2 403 may be configured as a model development module 420 and model execution module 430. The Application Server-2 403 is communicatively coupled to Application Server-1 402 and the user interface 401. From the user interface 401, a user (e.g., plant engineer, plant operator or other plant personnel) may initiate building and validating APC seed models. In response, the user interface 401 may communicate with the model development module 420, to build and deploy APC seed models using step 1500 of workflow 1000 as detailed above in FIG. 2G.

In response to additional user input, the user interface 401 may communicate with the model execution module 430 to perform functions of step 1600 (detailed in FIG. 2H) to monitor and adjust a deployed APC seed model created by workflow 1000. Using the deployed APC seed models, the model execution module 430 may perform closed-loop testing online for a plant process. The model execution module 430 may use the seed model in a MPC controller 105, to execute process MPC control while performing closed-loop plant testing on one or more input-output pairs to generate more informative process data.

The model execution module 430 may also automatically provide input (adjust parameters/variables/constraints) to the DCS 404, or any other plant or refinery control system or processing system coupled to the DCS system 404. The Instrumentation, Control, Operation Computer 405, based on the input, may then automatically adjust or program (via network 408) physical valves, actuators, heaters, and the like 409A-409I, or program any other plant or refinery control system or processing system coupled to the DCS system 404, to execute the closed-loop testing and MPC control in the plant process 110. The model execution module 430 may also provide operation status and optimization results to the user interface 401 for presentation to the user, and the user, via the user interface 401, may initiate actions (e.g., adjust or program physical equipment) at the DCS system 404 or other plant or refinery control system or processing system coupled to the DCS system 404. In this way, embodiments support manufacturers continually optimizing the performance of their assets—improving safety, managing risk, reducing downtime, enhancing productivity, and increasing profitability.

Figure 4C:
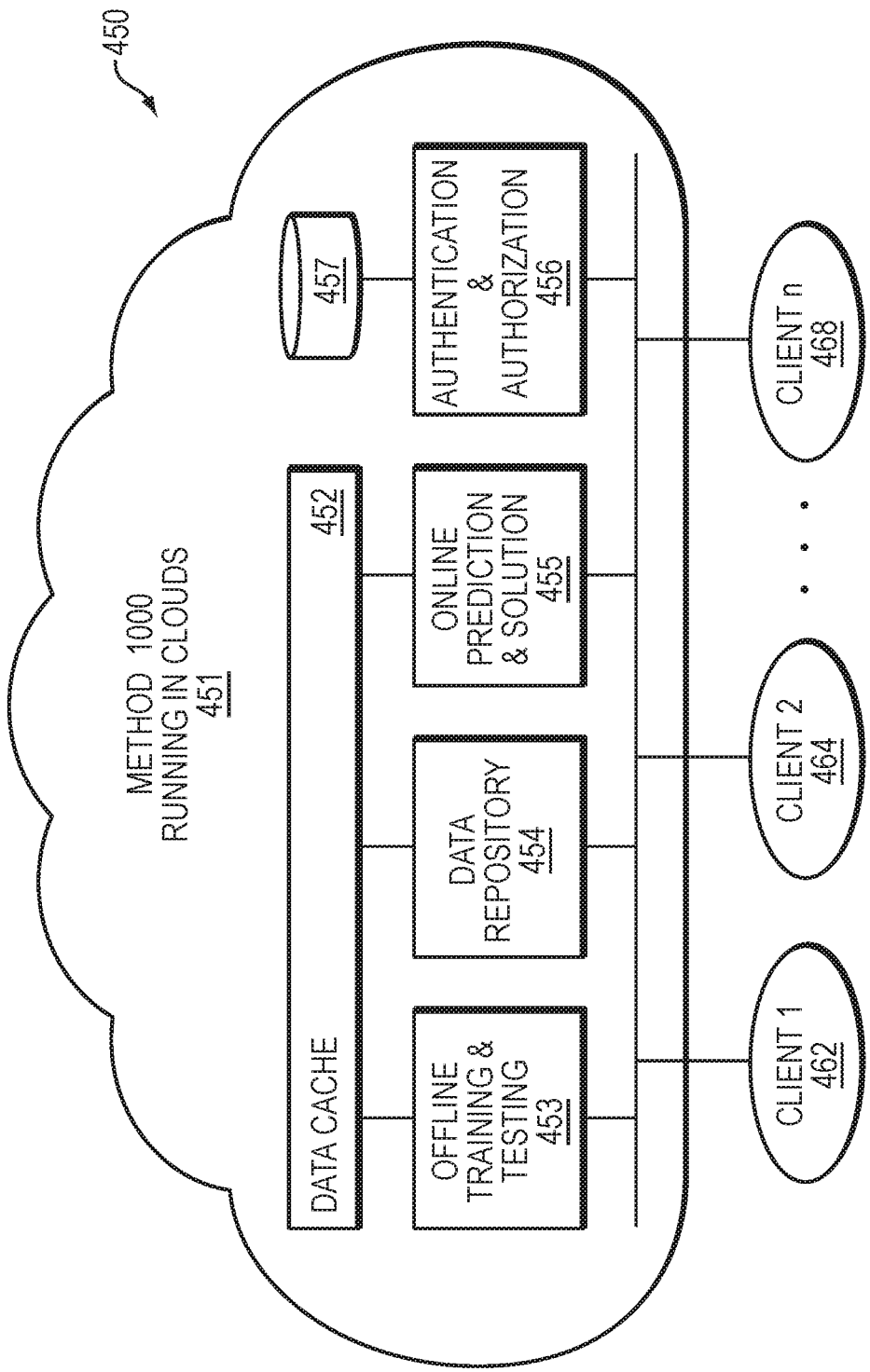
FIG. 4C is a block diagram illustrating an example computer cloud environment for building and deploying a seed-model in an industrial process.

FIG. 4C illustrates a block diagram depicting an example cloud computing environment 450 for building and deploying APC seed models in embodiments of the present invention. Such an environment 450 is capable of handling a large number of applications and, in super-fast-speed, performing multiple tasks related to modeling, predicting, and optimizing process operations. The environment 450 of FIG. 4C can perform workflow 1000 steps described in FIGS. 2A-2H. The cloud computing environment 450 includes a cloud computing engine 451 configured to perform offline model training and testing 453, online model predicting and optimizing 455, and authentication and authorization 456. The cloud computing engine 451 is also coupled to a data repository 454, data cache 452, and authentication & authorization database 457. The cloud computing engine 451 receives requests from any one of the shown clients 462, 464, . . . , 468. The cloud computing engine 451 checks the received requests by completing authentication and authorization 456 on the received request. The cloud computing engine 451 only executes tasks that are permitted according to the authentication and authorization 456 (i.e., what to do, what can do, and how to do it). Using authenticated/ authorized requests, the powerful cloud computing engine 451, in a super-fast way, builds, trains, and tests 453 models and deploys these models online to predict and optimize 455 a plant for a subject process. The cloud computing engine 451 then sends back results and reports to clients 462, 464, . . . , 468.

Digital Processing Environment

Figure 5:
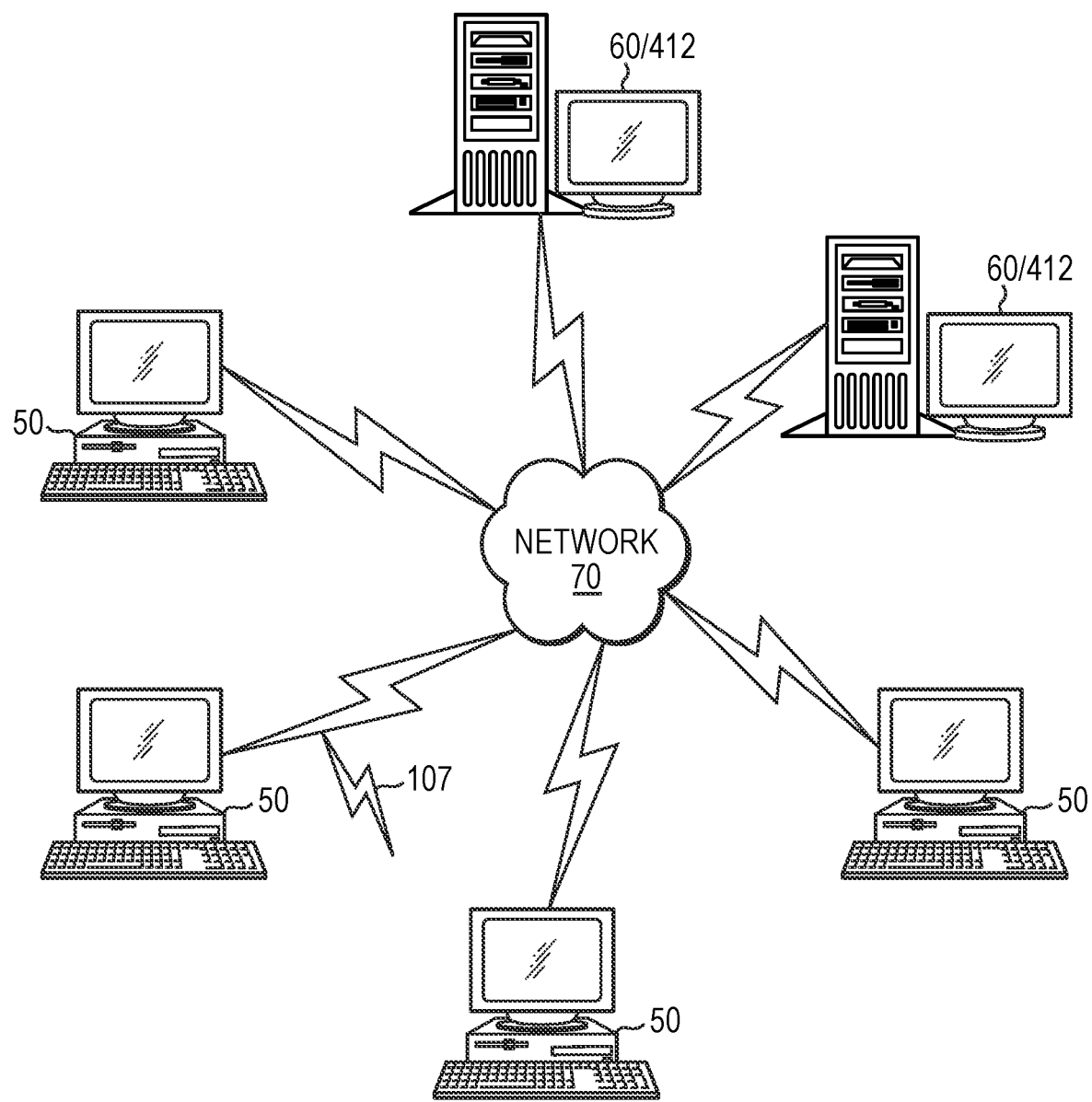
FIG. 5 is a schematic view of a computer network in which embodiments can be implemented.

FIG. 5 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

For example, server computers 60 may also be configured as Data Server 412 for loading historical plant data (e.g., measurements and enriched feature values) from Database 411 into a dataset in the network architecture 400 (e.g., by executing steps 1100-1400 of method 1000). Server computers 60 may also be configured as Application Server-1 402 or Application Server-2 403 (including modules 410, 420, and 430) to reduce process variables' measurements and enrich feature variables' values from the dataset (e.g., by executing steps 1100 to 1400 of workflow 1000) and to build and deploy an APC seed model (e.g., by executing steps 1500 and 1600). The server computers 60 may also be configured as an Instrumentation, Control, and Operation Computer 405 configured as part of the DCS 404 in the network architecture 400 or Data Module 115, and MPC Controller 105 configured as part of multivariate control modeling and control system 101. The Instrumentation, Control, and Operation Computer 405 may be communicatively coupled to client devices 50, including sensors 406-407 and other measurement control devices (valves, actuators, heaters, and the like) 409A-I for adjusting a plant process based on the built and deployed model and optimization solution.

Figure 6:
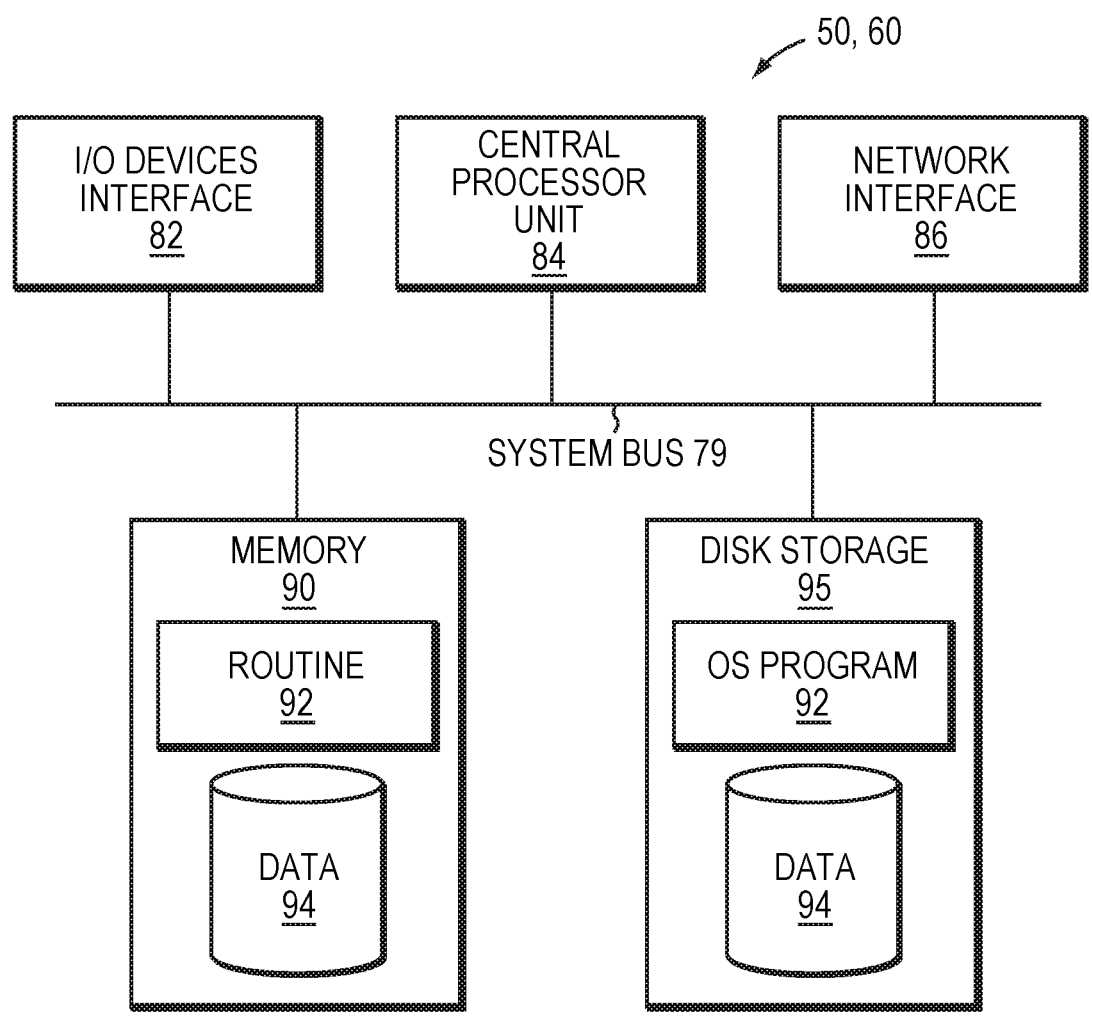
FIG. 6 is a block diagram of a computer node or device in the computer network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (processor, disk storage, memory, input/output ports, network ports, etc.) that enables the transfer of information between the elements. Attached to system bus 79 is I/O device interface 82 (such as user interface 401 of the network architecture 400 of FIG. 4A) for connecting various input and output devices (keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., APC seed model built and deployed in the processes of FIGS. 2A-2F). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/ program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for process modeling and control, comprising:
    receiving data comprising process variables for a subject industrial process of a plant, the process variables including an engineering tag and measurements and said receiving being performed by one or more digital processors;
    creating, from the received data, a working dataset; the creating being automatically performed by the one or more processors and including:
        (i) identifying, based on associations of process variables and calculated statistics, the process variables that comprise PID loops and cascade control loops and associated loop variable types;
        (ii) selecting based at least on the identified process variables that comprise PID loops and cascade control loops and associated loop variable types, a first set of process variables as candidate independent variables and a second set of process variables as candidate dependent variables of an empty model of the subject industrial process, the empty model having undefined independent and dependent variables and undetermined model input-output configurations;
        (iii) searching the measurements of the first set of process variables in the received data to identify informative moves, based on a magnitude of the change in value of the measurements, for each of the selected candidate independent variables; and
        (iv) generating data slices of the received data corresponding to each of the candidate independent variables and at least one of the candidate dependent variables based on the identified informative moves in the measurements of the first set of process variables;
    the working dataset being formed of and storing the generated data slices;
    building sub-models for the subject industrial process using the generated data slices stored in the working dataset, the sub-models having various model input-output configurations for the selected candidate independent variables and the selected candidate dependent variables and the building being implemented by the one or more processors;
    assembling the sub-models in a manner to complete the empty model and producing a seed model of the subject industrial process, the produced seed model utilizing the candidate independent variables and candidate dependent variables of the assembled sub-models as independent variables and dependent variables and utilizing the model input-output configurations of the assembled sub-models as model input-output configurations, said assembling being automatically performed by the one or more processors; and
    controlling the subject industrial process at the plant based on the produced seed model.

2. The method of claim 1, wherein the seed model is a multivariable process control (MPC) seed model and the subject industrial process is controlled by a multivariable process control (MPC) controller.

3. The method of claim 2 wherein the step of controlling the subject industrial process includes controlling the subject industrial process based on the produced seed model while configuring a closed-loop testing under the MPC controller; and the method further comprises:
    performing continuous closed-loop testing;
    collecting new data; and
    updating the sub-models until a complete MPC model is built and the requirements of a complete model are met for a standard industrial MPC application.

4. The method of claim 1 wherein the received data is historical plant data.

5. The method of claim 1 wherein creating the working dataset further comprises processing the received dataset including at least one of identifying bad data segments, repairing some of the bad data segments with estimates, and preprocessing the dataset for model identification.

6. The method of claim 1 wherein identifying the process variables that comprise PID loops and cascade control loops and associated loop variable types further includes applying automated algorithms to classify and infer PID loop and Cascade loop variables based on engineering tag name strings and data statistics.

7. The method of claim 1 wherein selecting a first set of process variables as candidate independent variables and a second set of process variables as candidate dependent variables of an empty model is further based on a received user input.

8. The method of claim 1 wherein creating the working dataset further comprises:
    detecting highly correlated candidate independent variables by performing cross-correlation analysis; and
    removing highly correlated candidate independent variables from the received dataset.

9. The method of claim 8 wherein the cross-correlation analysis includes projecting the process variable measurement data onto a latent space and applying machine-learning data clustering analysis on the projected dataset.

10. The method of claim 1 wherein creating the working dataset further comprises:

performing a nonlinearity analysis on each of the candidate dependent variables versus the candidate independent variables; and applying a nonlinear transform to a detected nonlinear candidate dependent variable.

11. The method of claim 10 wherein the nonlinearity analysis includes a) iteratively building a linear model via subspace identification; b) generating model predictions with the identified linear model; c) comparing predictions against raw measurements; d) calculating deformation values; and e) applying a test nonlinear transform.

12. The method of claim 11 further comprising repeating the nonlinearity analysis until an optimal nonlinear transform is found and applied.

13. The method of claim 1 wherein creating the working dataset further comprises:

defining a specific time-series key performance indicator sensitive to the informative moves, based on calculation of a time-series matrix profile with a moving window; and wherein searching the measurements of the first set of process variables uses the defined specific time-series key performance indicator.

14. The method of claim 13 wherein the specific time-series key performance indicator is defined as $$KPImoves = \frac{\sqrt{\int_1^n \Delta x^2}}{n^p}$$

where $\Delta x = x(t) - x(t-1)$, n is the length of a moving window, and p is $0 \le p \le 5$.

15. The method of claim 1 wherein the searching of measurements includes applying datamining steps to automatically search the measurements of the first set of process variables to identify informative moves for each of the candidate independent variables.

16. The method of claim 15 wherein the datamining steps include any of: a) calculating a key performance indicator vector for each of the independent variables; b) rescaling the key performance indicator vectors resulting in a group of scaled key performance indicator time series; and c) screening the key performance indicator time series and marking measurements associated with the key performance indicator time series exceeding a threshold as containing the informative moves.

17. The method of claim 1 wherein the various model input-output configurations include at least one of SIMO, SISO, MISO, and MIMO.

18. The method of claim 1 wherein the step of assembling further comprises: identifying relatively higher quality sub-models based on iterative model identification and optimal model selection, the relatively higher quality sub-models being used in said assembling to produce the seed model.

19. The method of claim 1 further comprising collecting from the plant online testing data and repeating sub-model identification to update the seed model until the seed model converges to a stable model of the subject industrial process.

20. A computer-based system of advance process control, the system comprising:

a) a source of historical plant data of a subject industrial process at an industrial plant, the historical plant data comprising process variables of the subject industrial process, each process variable including an engineering tag and measurements related to at least one component of the subject industrial process;

b) a data analyzer communicatively coupled to the source, the data analyzer executed by a processor and forming a working dataset from the historical plant data by automatically:

(i) screening engineering tags and identifying PID loops and cascade control loops based on associations of process variables and calculated statistics, (ii) determining, based on the identified PID loops and cascade control loops, candidate independent process variables indicative of manipulated variables (MVs), and determining candidate dependent process variables indicative of controlled variables (CVs) to configure an MPC controller, (iii) searching plural historical time-series of the measurements of the candidate independent process variables and identifying, based on a magnitude of the change in value of the measurements, informative "moves" for each candidate independent process variable, and (iv) generating informative data slices of the historical plant data corresponding to each MV and selected CVs, the generated data slices being stored in the working dataset; and (c) a seed model builder engine coupled to receive the working dataset from the data analyzer, the seed model builder engine: (i) building sub-models for the subject industrial process using the generated data slices stored in the working dataset, including running subspace identification in various model input-output configurations for the determined candidate independent process variables and the determined candidate dependent variables to obtain the sub-models, and (ii) assembling the sub-models in a manner producing a seed model representative of the subject industrial process for initiating the MPC controller, the produced seed model utilizing the candidate independent variables and candidate dependent variables of the assembled sub-models as independent variables and dependent variables and utilizing the model input-output configurations of the assembled sub-models as model input-output configuration, the MPC controller being deployed with the produced seed model and controlling the subject industrial process at the plant.

21. The system of claim 20 further comprising a data preprocessor coupled between the source and the data analyzer, the data preprocessor cleaning the historical plant data by identifying bad data slices and repairing some bad data slices with interpolations or model predictions.

22. The system of claim 20 wherein the data analyzer further identifies groups of highly correlated candidate independent variables by performing cross-correlation analysis and removing some highly correlated candidate independent process variables.

23. The system of claim 20 wherein the data analyzer further checks the linearity of each output CV against the candidate independent process variables; and applies a nonlinear transform to a detected nonlinear CV.

24. The system of claim 20 wherein the various model input-output configurations utilized in the seed model builder engine include SIMO, SISO, MISO, and MIMO to obtain sub-models.

25. The system of claim 20 wherein the seed model builder engine further selects for assembly relatively higher quality sub-models based on an iterative model identification and optimal model selection.

26. The system of claim 20 wherein the data analyzer further collects fresh online testing data from the plant; and the seed model builder engine repeats sub-model identification to update the seed model until the seed model converges to a stable model of the subject industrial process.

* * * * *